United States Patent
Schwabe et al.

(10) Patent No.: US 7,444,631 B2
(45) Date of Patent: Oct. 28, 2008

(54) TOKEN-BASED LINKING

(75) Inventors: Judith E. Schwabe, San Mateo, CA (US); Joshua B. Susser, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 903 days.

(21) Appl. No.: 10/997,359

(22) Filed: Nov. 23, 2004

(65) Prior Publication Data

US 2005/0097550 A1    May 5, 2005

Related U.S. Application Data

(63) Continuation of application No. 09/243,108, filed on Feb. 2, 1999, now Pat. No. 6,880,155.

(51) Int. Cl.
*G06F 9/45* (2006.01)
(52) U.S. Cl. ..................................................... 717/178
(58) Field of Classification Search ................. 717/178
See application file for complete search history.

(56) References Cited

U.S. PATENT DOCUMENTS

| | | | |
|---|---|---|---|
| 5,367,685 A | 11/1994 | Gosling | 395/700 |
| 5,613,101 A | 3/1997 | Lillich | |
| 5,615,137 A | 3/1997 | Holzmann et al. | |
| 5,619,695 A | 4/1997 | Arbabi et al. | 709/100 |
| 5,668,999 A | 9/1997 | Gosling | |
| 5,701,408 A | 12/1997 | Cornell et al. | |
| 5,734,822 A | 3/1998 | Houha et al. | |
| 5,748,964 A | 5/1998 | Gosling | |
| 5,778,231 A | 7/1998 | van Hoff et al. | |
| 5,778,234 A | 7/1998 | Hecht et al. | 717/11 |
| 5,802,519 A | 9/1998 | De Jong | 707/100 |
| 5,841,866 A | 11/1998 | Bruwer et al. | 380/23 |
| 5,889,992 A | 3/1999 | Koerber | 717/108 |
| 5,905,987 A | 5/1999 | Shutt et al. | 707/103 |
| 5,937,412 A | 8/1999 | Kohli et al. | 707/104 |
| 5,966,702 A | 10/1999 | Fresko et al. | 707/1 |
| 5,974,454 A | 10/1999 | Apfel | 709/221 |

(Continued)

FOREIGN PATENT DOCUMENTS

EP    0 292 248    5/1988

(Continued)

OTHER PUBLICATIONS

Sun Microsystems, Inc., "Java Card 2.0 Language Subset and Virtual Machine Specification," Rev. 1 Final, Oct. 13, 1997.

(Continued)

*Primary Examiner*—John Chavis
(74) *Attorney, Agent, or Firm*—Gunnison, McKay & Hodgson, L.L.P.; Forrest Gunnison

(57) ABSTRACT

A system links architecture neutral code downloaded to a resource constrained computer. The code may be separated into one or more packages having one or more referenceable items. The system maps the one or more referenceable items into corresponding one or more tokens; orders the tokens to correspond to a run-time mode; downloads the packages to the resource constrained computer; and links the packages into an executable code using the ordered tokens.

71 Claims, 29 Drawing Sheets

U.S. PATENT DOCUMENTS

| | | | | |
|---|---|---|---|---|
| 6,005,942 | A | 12/1999 | Chan et al. | 380/25 |
| 6,038,551 | A | 3/2000 | Barlow et al. | 705/41 |
| 6,067,558 | A * | 5/2000 | Wendt et al. | 709/202 |
| 6,092,147 | A | 7/2000 | Levy et al. | 711/6 |
| 6,131,159 | A | 10/2000 | Hecht et al. | 713/1 |
| 6,141,681 | A | 10/2000 | Kyle | 709/206 |
| 6,145,021 | A | 11/2000 | Dawson et al. | 710/8 |
| 6,163,811 | A | 12/2000 | Porter | 235/380 |
| 6,178,546 | B1 | 1/2001 | McIntyre | 717/3 |
| 6,226,744 | B1 | 5/2001 | Murphy et al. | 713/200 |
| 6,233,683 | B1 | 5/2001 | Chan et al. | 713/172 |
| 6,272,674 | B1 | 8/2001 | Holiday, Jr. | |
| 6,308,317 | B1 | 10/2001 | Wilkinson et al. | 717/139 |
| 6,349,344 | B1 | 2/2002 | Sauntry et al. | |
| 6,434,561 | B1 | 8/2002 | Durst et al. | 707/10 |
| 6,438,550 | B1 | 8/2002 | Doyle et al. | 707/9 |
| 6,470,494 | B1 | 10/2002 | Chan et al. | |
| 6,477,702 | B1 | 11/2002 | Yellin et al. | 717/126 |
| 6,481,632 | B2 | 11/2002 | Wentker et al. | 235/492 |
| 6,496,910 | B1 * | 12/2002 | Baentsch et al. | 711/165 |
| 6,519,767 | B1 | 2/2003 | Carter et al. | |
| 6,557,032 | B1 | 4/2003 | Jones et al. | 709/220 |
| 7,334,136 | B2 * | 2/2008 | Levy et al. | 713/194 |
| 2002/0040936 | A1 | 4/2002 | Wentker et al. | |

FOREIGN PATENT DOCUMENTS

| | | |
|---|---|---|
| EP | 0 498 130 A2 | 12/1991 |
| EP | 0 685 792 | 12/1995 |
| EP | 0 778 520 | 11/1996 |
| EP | 0 778 520 A2 | 11/1996 |
| EP | 0 748 135 B1 | 12/1996 |
| EP | 0 778 522 A2 | 6/1997 |
| EP | 0 865 217 A2 | 9/1998 |
| WO | WO 94/30023 | 12/1994 |
| WO | WO 98/19237 | 5/1998 |
| WO | WO 98/52158 | 11/1998 |
| WO | WO 00/00890 | 1/2000 |
| WO | WO 00/25278 | 5/2000 |
| WO | WO 00/46666 | 8/2000 |

OTHER PUBLICATIONS

Sun Microsystems Inc., "Java Card 2.0 Programming Concepts", Revision 1.0 Final, Oct. 15, 1997.

"Sun Microsystems Announces Javacard API", Business Wire, Oct. 1996.

Sun Microsystems, Inc., "Sun's Java Technology Leads Open Worldwide Market for Smart Cards", M2, Presswire, May 1999.

Basin, D. et al. "Java Bytecode Verification by Model Checking", CAV 99: 11$^{th}$ International Conference on Computer Aided Verification, vol. 1633 of LNCS, pp. 491-494 (1999).

Bowles et al., "A Comparison of Commercial Reliability Prediction Programs", *Proceedings Annual Reliability and Maintainability Symposium*, IEEE, pp. 450-455 (1990).

Cooper, Richard, "Persistent Languages Facilitate the Implementation of Software Version Management", *IEEE*, pp. 56-65 (1989).

Lindsay et al., "A Generic Model for Fine Grained Configuration Management Including Version Control and Traceability", *Proceedings of the Australian Software Engineering Conference (ASWEC'97)*, IEEE Computer Society, pp. 27-36 (1997).

Posegga, J. et al. "Byte Code Verification for Java Smart Cards Based on Model Checking", Sep. 16-18, 1998, Computer Sercurity-Esorics 98, Proceedings of the 5th European Symposium on Research in Computer Security.

Suresh Subramanian, "*Cruise: Using Interface Hierarchies to Support Software Evolution*", IEEE, 1988, pp. 132-142.

International Search Report, PCT/US 01/28579, International filing date Sep. 12, 2001, date Search Report mailed-Jan. 5, 2004.

International Search Report, PCT/US 01/28688, International filing date Sep. 14, 2001, date Search report mailed-Jan. 5, 2004.

International Preliminary Examination Report, PCT/US01/28687, International filing date Sep. 14, 2001, date Search Report mailed Jan. 5, 2004.

Cyberflex—Opening Page, printed from http://www.cyberflex.slb.com on Jan. 15, 1999.

"Java Developer's Journal Names Cyberflex Smart Card as Editor's Choice Finalist", Jan. 11, 1999, printed from http://www.slb.com/ir/news/sct-jdj0199.html on Jan. 15, 1999.

"Schlumberger Announces Cyberflex Access; Java™-Based Smart Card Combines Multiple Application and Cryptographic Features for Information Security Market", Dec. 8, 1998, printed from http://www.cyberflex.slb.com/Ac...ex_Access/cyberflex_access.html on Jan. 15, 1999.

"What is the EmbeddedJava™ Application Environment" printed from http://java.sun.com/products/embeddedjava/overview.html on Jan. 27, 1999.

* cited by examiner

Instance Field Reference (internal field) ⟵ 192

| 0 | offset to class_info structure in Class Component | field token |
|---|---|---|
| 23 | 16 15 8 | 7 0 |

FIG. 7G

Virtual Method Reference to Public or Protected Method (internal method) ⟵ 194

| 0 | offset to class_info structure in Class Component | 0 | method token |
|---|---|---|---|
| 23 | 16 15 8 | 7 | 0 |

FIG. 7H

Virtual Method Reference to Package Visible Method (internal method) ⟵ 196

| 0 | offset to class_info structure in Class Component | 1 | method token |
|---|---|---|---|
| 23 | 16 15 8 | 7 | 0 |

FIG. 7I

TOKEN-BASED LINKING

CROSS REFERENCE TO RELATED APPLICATIONS

This application is a continuation of U.S. patent application Ser. No. 09/243,108, entitled "Token-based Linking," of Judith E. Schwabe and Joshua B. Susser filed on Feb. 2, 1999, now U.S. Pat. No. 6,880,155, which application is incorporated herein by reference in its entirety.

The following applications are related to this application:

U.S. patent application Ser. No. 09/243,101, filed Feb. 2, 1999, entitled "Object-Oriented Instruction Set for Resource-Constrained Devices", in the names of Judith E. Schwabe and Joshua Susser, commonly assigned herewith, which is incorporated herein by reference its entirety;

U.S. patent application Ser. No. 09/243,107, filed Feb. 2, 1999, in the names of Judith E. Schwabe and Joshua Susser, entitled "Zero Overhead Exception Handling", commonly assigned herewith, which is incorporated herein by reference in its entirety; and U.S. patent application Ser. No. 10/664,216, entitled "Virtual Machine with Securely Distributed Bytecode Verification" by inventors Moshe Levy and Judith E. Schwabe, filed on Sep. 16, 2003, which is a continuation of U.S. patent application Ser. No. 10/283,305, now U.S. Pat. No. 6,640,279, entitled "Virtual Machine with Securely Distributed Bytecode Verification" by Moshe Levy and Judith E. Schwabe, filed on Oct. 30, 2002, which is a continuation of U. S. patent application Ser. No. 09/547,225, now U.S. Pat. No. 6,546,454, entitled "Virtual Machine with Securely Distributed Bytecode Verification" by Moshe Levy and Judith E. Schwabe, filed on Apr. 11, 2000, which is a continuation of U.S. patent application Ser. No. 08/839,621, now U.S. Pat. No. 6,092,147, filed Apr. 15, 1997 entitled "Virtual Machine with Securely Distributed Bytecode Verification" by Moshe Levy and Judith E. Schwabe, commonly assigned herewith and U.S. patent application Ser. No. 08/839,621 is incorporated herein by reference in its entirety.

In addition, an Appendix A entitled "Java Card Virtual Machine Specification: Java Card™ Version 2.1" is attached to this application and forms a part of the present specification.

BACKGROUND

The present invention relates, in general, to object-oriented, architecture-neutral programs for use with resource-constrained devices such as smart cards and the like.

A virtual machine is an abstract computing machine generated by a software application or sequence of instructions which is executed by a processor. The term "architecture-neutral" refers to programs, such as those written in the Java™ programming language, which can be executed by a virtual machine on a variety of computer platforms having a variety of different computer architectures. Thus, for example, a virtual machine being executed on a Windows™-based personal computer system will use the same set of instructions as a virtual machine being executed on a UNIX™-based computer system. The result of the platform-independent coding of a virtual machine's sequence of instructions is a stream of one or more bytecodes, each of which is, for example, a one-byte-long numerical code.

Use of the Java programming language has found many applications including, for example, those associated with Web browsers.

The Java programming language is object-oriented. In an object-oriented system, a "class" describes a collection of data and methods that operate on that data. Taken together, the data and methods describe the state of and behavior of an object.

The Java programming language also is verifiable such that, prior to execution of an application written in the Java programming language, a determination can be made as to whether any instruction sequence in the program will attempt to process data of an improper type for that bytecode or whether execution of bytecode instructions in the program will cause underflow or overflow of an operand stack.

A Java™ virtual machine executes virtual machine code written in the Java programming language and is designed for use with a 32-bit architecture. However, various resource-constrained devices, such as smart cards, have an 8-bit or 16-bit architecture.

Smart cards, also known as intelligent portable data-carrying cards, generally are made of plastic or metal and have an electronic chip that includes an embedded microprocessor to execute programs and memory to store programs and data. Such devices, which can be about the size of a credit card, typically have limited memory capacity. For example, some smart cards have less than one kilo-byte (1K) of random access memory (RAM) as well as limited read only memory (ROM), and/or non-volatile memory such as electrically erasable programmable read only memory (EEPROM).

Generally, programs running on a processor of a smart card determine the services offered by the card. As time passes, the programs on the card may need to be updated, for example in order to add a new function or to improve an existing function. To this end, the card should be able to accept new programs which may replace other programs.

Typically a virtual machine executing byte code (e.g., a full Java virtual machine) requires a sizable amount of memory in loading bytecode and resolving references. Particularly, in the Java virtual machine, symbolic references are used to refer to program elements such as the classes, methods and fields. A Reference to these program elements is resolved by locating the element using its symbolic name. Such operations require a relatively large random access memory (RAM). In an environment that has little RAM, this may not be feasible. Since smart cards are cost-sensitive, they rely on inexpensive, low performance processors and low capacity memory devices. Since cost and power reasons dictate that low-power and low-capacity processor and memory components be deployed in such resource constrained computers, the ability to operate the Java virtual machine on such resource constrained devices is both difficult and yet desirable.

SUMMARY

In one aspect, a method downloads code to a resource constrained computer. The code is separable into at least one package having at least one referenceable item. The method includes forming the package; forming a mapping of the referenceable item to a corresponding token; and providing the package and the mapping.

In a second aspect, a method links code downloaded to a resource constrained computer. The method includes receiving the package; receiving a mapping of the referenceable item to a corresponding token; and linking the package using the mapping.

Advantages of the invention may include one or more of the following. The invention efficiently uses resource on a resource limited device by using smaller storage spaces through unique token identifiers. Further, the invention can link and resolve references to exported items on the resource limited device. Through metadata files such as export files, the invention allows exported elements to be published. Such publication, however, can be done so as to not expose private or proprietary elements and details of the applets and associated libraries. Thereby, various separately developed applications can be loaded onto a resource limited device and share their components with each other without compromising private secure information.

Moreover, the advantages of an architecture neutral language such as Java can be realized on a resource limited device while preserving its semantics. The tokens may also be used for internal or private elements. Thus, tokens can be assigned to private and package visible instance fields as well as package visible virtual methods. The invention imposes few constraints in assigning tokens, and the token categories may be further defined or optimized for particular applications. As such, the invention supports portable, architecture neutral code that is written once and that runs everywhere, even on resource constrained devices such as smart cards with limited storage capacity.

DRAWINGS

FIGS. 7A-7I are diagrams illustrating various class, field and method references.

DESCRIPTION

A method is described for representing linking information for object-oriented programs in a compact, secure format. Utilizing this method, said programs can be downloaded, linked and executed on a resource-constrained device. Resource-constrained devices are generally considered to be those that are restricted in memory and/or computing power or speed. Although the particular implementation discussed below is described in reference to a smart card, the invention can be used with other resource-constrained devices including, but not limited to, cellular telephones, boundary scan devices, field programmable devices, personal data assistants (PDAs) and pagers, as well as other small or miniature devices. In some cases, the resource-constrained device may have as little as 1K of RAM or as little as 16K of ROM. Similarly, some resource-constrained devices are based on an architecture designed for fewer than 32 bits. For example, some of the resource-constrained devices which can be used with the invention are based on an 8-bit or 16-bit architecture, rather than a 32-bit architecture.

Figure 1:
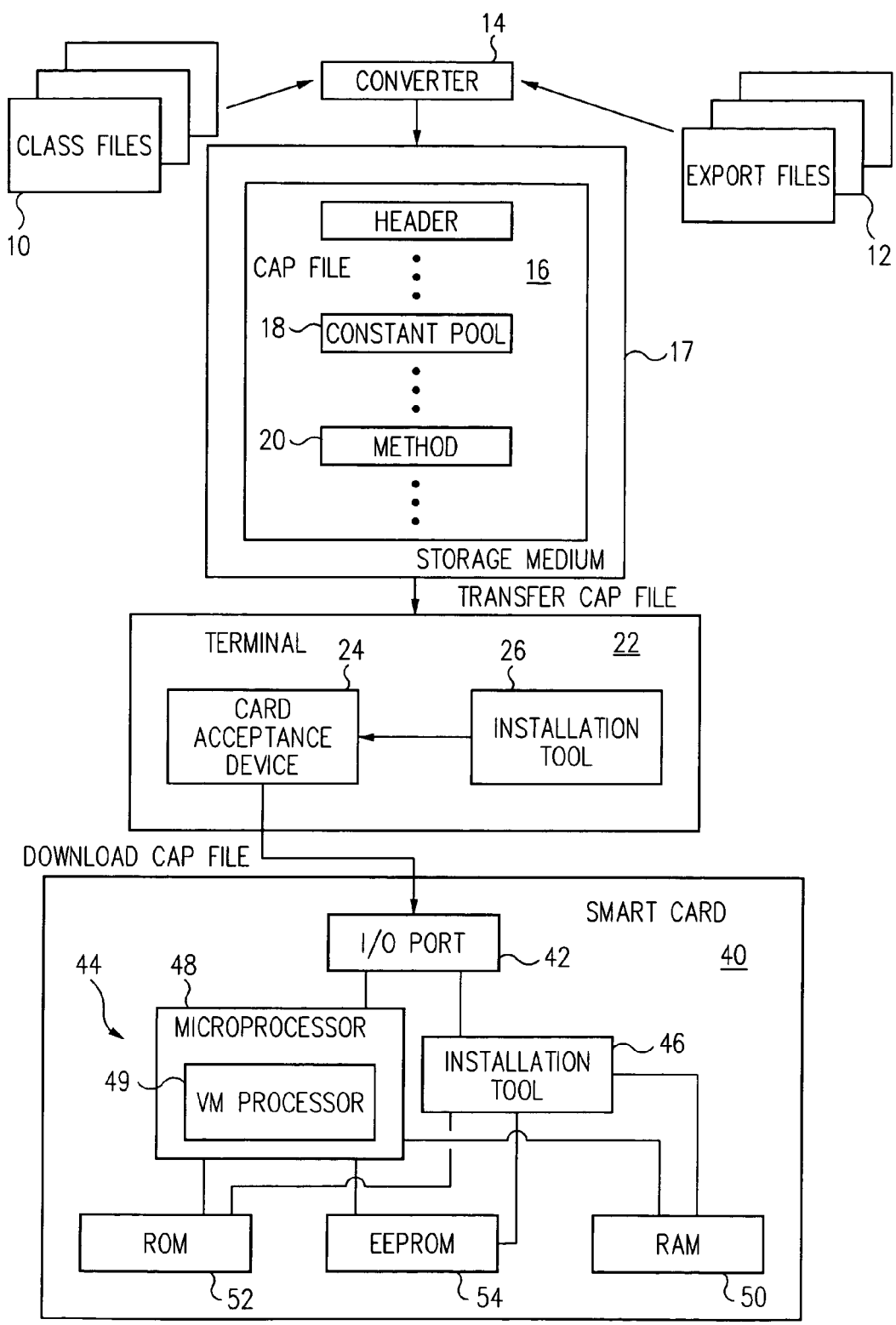
FIG. 1 illustrates the conversion and loading of hardware platform-independent code onto a smart card.

Referring to FIG. 1, development of an applet for a resource-constrained device, such as a smart card 40, begins in a manner similar to development of a Java program. In other words, a developer writes one or more Java classes and compiles the source code with a Java compiler to produce one or more class files 10. The applet can be run, tested and debugged, for example, on a workstation using simulation tools to emulate the environment on the card 40. When the applet is ready to be downloaded to the card 40 the class files 10 are converted to a converted applet (CAP) file 16 by a converter 14. The converter 14 can be a Java application being executed by a desktop computer. The converter 14 can accept as its input one or more export files 12 in addition to the class files 10 to be converted. An export file 12 contains naming or linking information for the contents of other packages that are imported by the classes being converted.

In general, the CAP file 16 includes all the classes and interfaces defined in a single Java package and is represented by a stream of 8-bit bytes. All 16-bit and 32-bit quantities are constructed by reading in two or four consecutive 8-bit bytes, respectively. Among other things, the CAP file 16 includes a constant pool component (or "constant pool") 18 which is packaged separately from a methods component 20. The constant pool 18 can include various types of constants including method and field references which are resolved either when the program is linked or downloaded to the smart card 40 or at the time of execution by the smart card. The methods component 20 specifies the application instructions to be downloaded to the smart card 40 and subsequently executed by the smart card. Further details of the structure of an exemplary CAP file 16 are discussed in the attached Appendix A at pages 53 through 94.

After conversion, the CAP file 16 can be stored on a computer-readable medium 17 such as a hard drive, a floppy disk, an optical storage medium, a flash device or some other suitable medium. Or the computer-readable medium can be in the form of a carrier wave, e.g., a network data transmission, or a radio frequency (RF) data link.

The CAP file 16 then can be copied or transferred to a terminal 22 such as a desktop computer with a peripheral card acceptance device (CAD) 24. The CAD 24 allows information to be written to and retrieved from the smart card 40. The CAD 24 includes a card port (not shown) into which the smart card 40 can be inserted. Once inserted, contacts from a connector press against the surface connection area on the smart card 40 to provide power and to permit communications with the smart card, although, in other implementations, contactless communications can be used. The terminal 22 also includes an installation tool 26 which loads the CAP file 16 for transmission to the card 40.

The smart card 40 has an input/output (I/O) port 42 which can include a set of contacts through which programs, data and other communications are provided. The card 40 also includes an installation tool 46 for receiving the contents of the CAP file 16 and preparing the applet for execution on the card 40. The installation tool 46 can be implemented, for example, as a Java program and can be executed on the card 40. The card 40 also has memory, including volatile memory such as RAM 50. The card 40 also has ROM 52 and non-volatile memory, such as EEPROM 54. The applet prepared by the controller 44 can be stored in the EEPROM 54.

In one particular implementation, the applet is executed by a virtual machine 49 running on a microprocessor 48. The virtual machine 49, which can be referred to as the Java Card virtual machine, need not load or manipulate the CAP file 16.

Rather, the Java Card virtual machine 49 executes the applet code previously stored as part of the CAP file 16. The division of functionality between the Java Card virtual machine 49 and the installation tool 46 allows both the virtual machine and the installation tool to be kept relatively small.

In general, implementations and applets written for a resource-constrained platform such as the smart card 40 follow the standard rules for Java platform packages. The Java virtual machine and the Java programming language are described in T. Lindholm et al., The Java Virtual Machine Specification (1997), and K. Arnold et al., The Java Programming Language Second Edition, (1998), which are incorporated herein by reference in their entirety. Application programming interface (API) classes for the smart card platform can be written as Java source files which include package designations, where a package includes a number of compilation units and has a unique name. Package mechanisms are used to identify and control access to classes, fields and methods. The Java Card API allows applications written for one Java Card-enabled platform to run on any other Java Card-enabled platform. Additionally, the Java Card API is compatible with formal international standards such as ISO 7816, and industry-specific standards such as Europay/MasterCard/Visa (EMV).

Although a virtual machine 49 running on a microprocessor 48 has been described as one implementation for executing the bytecodes on the smart card 40, in alternative implementations, an application-specific integrated circuit (ASIC) or a combination of a hardware and firmware can be used instead.

Referring to FIG. 1, controller 44 uses an installation tool 46 for receiving the contents of the CAP file 16 and preparing the applet to be executed by a processor 48. The installation tool 46 can be implemented, for example, as a Java program which has been suitably converted to execute on the smart card 40. In the description below, it is assumed that the controller 44 comprises a virtual machine program 49 running on a microprocessor 48. The virtual machine 9 need not load or manipulate the CAP file 16. Rather, the virtual machine 49 executes the applet code in the CAP file 16. The division of functionality between the virtual machine 49 and the installation tool 46 allows both the virtual machine and the installation tool to be kept relatively small. In alternative implementations, the controller 44 can be hardwired, for example, as an application-specific integrated circuit (ASIC) or it can be implemented as a combination of a hardware and firmware.

The smart card platform, which can be used for other resource-constrained devices as well, supports dynamically created objects including both class instances and arrays. A class is implemented as an extension or subclass of a single existing class and its members are methods as well as variables referred to as fields. A method declares executable code that can be invoked and that passes a fixed number of values as arguments. Classes also can implement Java interfaces. An interface is a reference type whose members are constants and abstract methods. The virtual machine 49 may include an interpreter or native implementation which provides access to a runtime system which includes the Java Card API and supporting functionalities.

Figure 2:
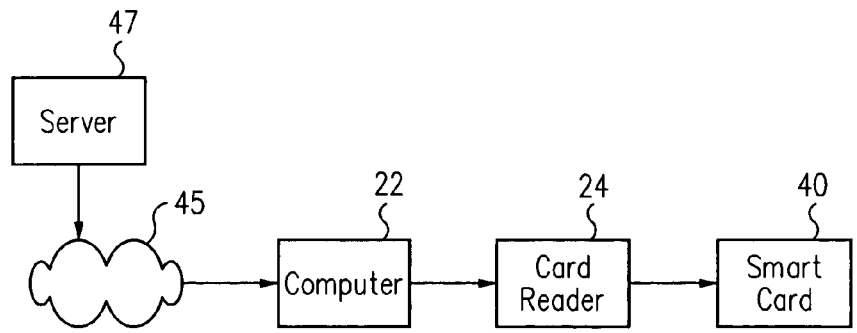
FIG. 2 shows a computer system which communicates with the smart card of FIG. 1.

As shown in FIG. 2, a computer 221 is equipped with a card acceptance device 24 for receiving the card 40 of FIG. 1. The computer 22 may be connected to a network 45 which communicates with a plurality of other computing devices, such as a server 47. It is possible to load data and software onto a smart card over the network 45 using card equipped devices. Downloads of this nature can include applets or other programs to be loaded onto a smart card as well as digital cash and other information used in accordance with a variety of electronic commerce and other applications. The instructions and data used to control processing elements of the card acceptance device and of the smart card may be stored in volatile or non-volatile memory or may be received directly over a communications link e.g., as a carrier wave containing the instructions and/or data. Further, for example, the network 45 can be a LAN or a WAN such as the Internet or other network.

Figure 3:
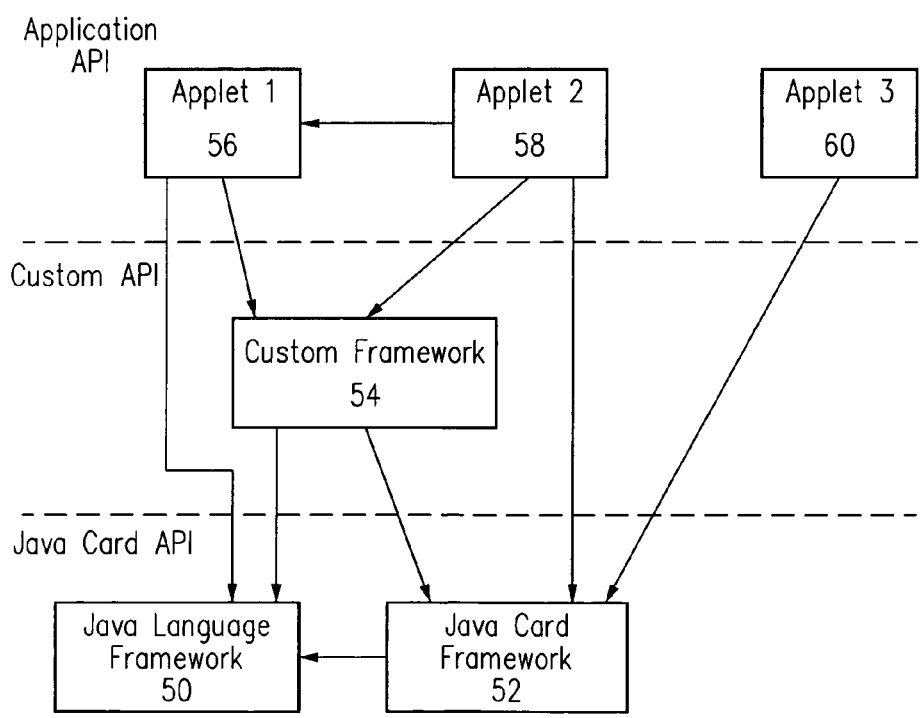
FIG. 3 shows a diagram illustrating inter-package dependencies.

FIG. 3 shows a diagram illustrating typical hierarchical dependencies among a group of program packages (including both Application Program Interfaces (APIs) and program applets) loaded onto a smart card 40. Applications may be loaded onto the smart card 40 incrementally and linked on-card for execution so that the functionality of the smart card 40 may be updated with additional capabilities in addition to factory-programmed functionalities. In the diagram, a Java language framework 50 and a Java Card framework 52 exist at a Java Card API level. Above the Java Card API level is a custom API level with one or more custom frameworks 54. The custom framework 54 may be supplied by one or more value added providers through various software development kits (SDKs) to extend an existing framework or other API. At the highest level is an application level where various applets 56, 58 and 60 reside.

As shown in FIG. 3, a package may depend on other packages at the same API level or from those packages in lower API levels. For example, the applet 58 may refer to program elements in the applet 58 and the Java Card framework 52 may have dependencies from the Java language framework 50. Moreover, the custom framework 54 at the custom API level and the applets 58 and 60 may have references that depend from the Java Card framework 52. In turn, the applets 56 and 58 may have references that depend from the custom framework 54. The applet 56 and the custom framework 54 may also depend from the Java language framework 50. Although the example of FIG. 3 shows linear dependencies, non-linear dependencies such as circular dependencies may be supported using a suitable converter 14 and installation tool 46.

The conversion of a set of class files from, e.g., a Java application, to a CAP file 74 can generally occur on a desktop computer in preparation for installation on a smart card 40. The desktop computer 22 is generally not as resource constrained as a typical smart card 40. Additionally, the converting operation may be conducted on other suitable platforms as well.

Figure 4A:
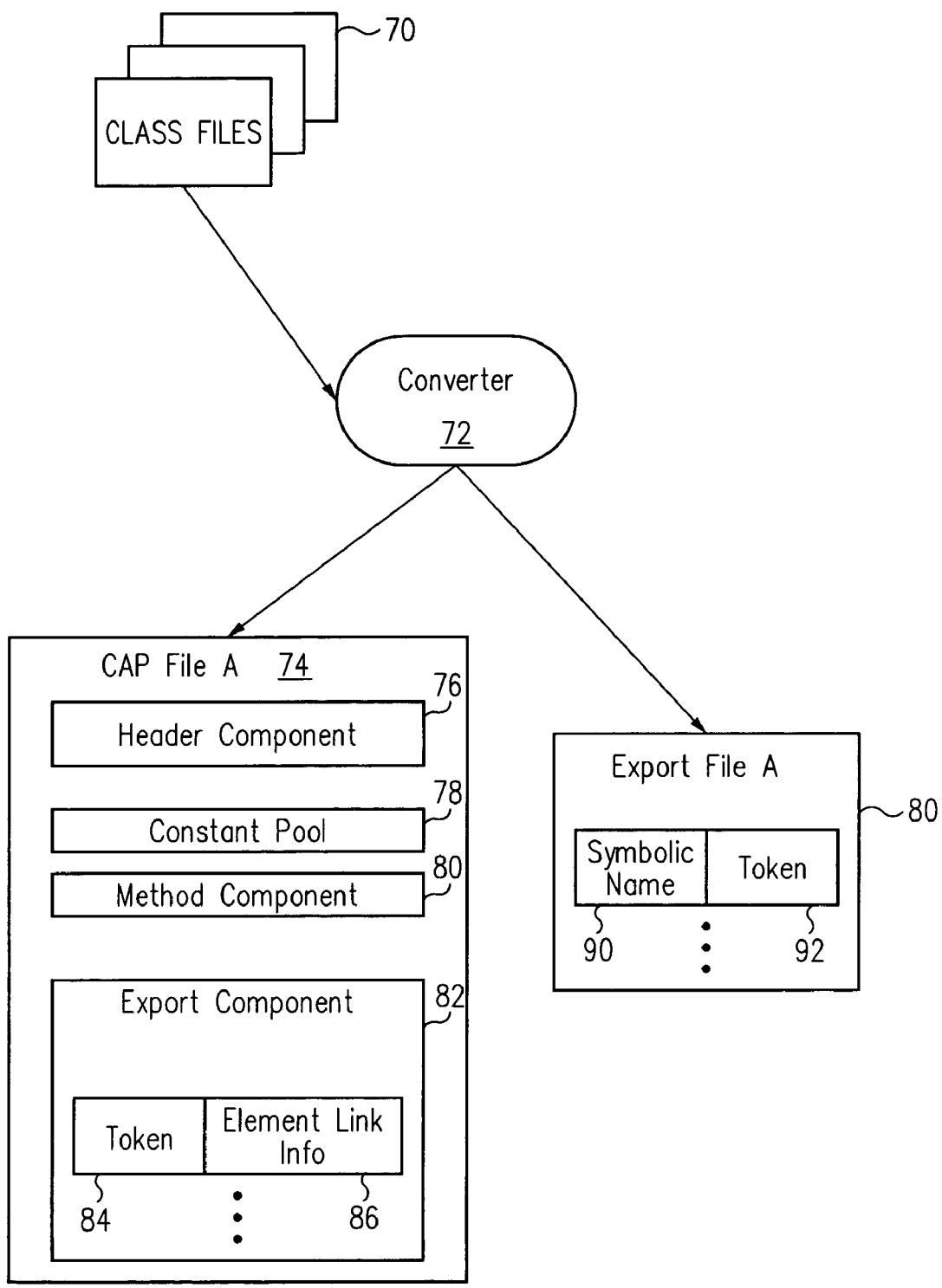
FIGS. 4A and 4B are diagrams illustrating two converter operations.

FIG. 4A shows a system for converting a package, which may define an applet or a library in preparation for downloading onto smart card 40. Converter 72 receives data input from one or more class files 70, which define the functionality of an applet. The converter 72 in turn generates a Java Card CAP file 74 suitable for downloading.

As discussed in greater detail below, the CAP file 74 contains an export component 82 for resolving references to elements in its package, where those elements may be referenced by other packages. The export component 82 contains entries for static items such as classes, methods and fields. References to dynamic items such as instance fields, virtual methods and interface methods are not required to be presented in the export component, but may be handled according to processes described below.

In resource constrained devices, the use of Unicode strings to represent items consumes memory and processor resources. In place of strings, the export component 82 maps tokens, or simple unique numerical values, to particular elements defined in other components in the CAP file 74. The token values used to represent these elements in the export component match those published in a corresponding Export File 80.

In more detail, CAP file 74 has, among others, a header component 76, a constant pool 78, a method component 80, and an export component 78. The constant pool 78 typically includes one or more class, field and method references so that generally references to program elements or items are made indirectly through the package's constant pool 78. Method component 80 contains all the methods implemented by the applet package represented by CAP file 74. Method references resolve to methods located in the method component. Class and static field references resolve to locations in class components and static field components, respectively. These are described further in Appendix A.

Export component 78 includes one or more entries with a token value 84 and corresponding program element link information 86 that describes where in the package defined in the CAP file A 74 a particular program element is to be found. The link information is specific to the content of the CAP file 74, not the internal representation on a particular card. This component, therefore, does not describe card-specific private or secure information.

Converter 72 can also generate an Export file 80 during conversion of class files into a CAP file 74. One Export file is generated for each CAP file. Export file 80 typically has one or more entries with a symbolic name 90 for a particular program element in CAP file 74 and its corresponding token value 92. Export file 80 provides information about each externally accessible program element of the package of class files and program information in CAP file 74 that may be referenced (imported) by a second package into a second CAP file (described further below). For example, Export file 80 contains references to all of the public classes and interfaces defined in one Java package, and all of the public and protected fields and methods defined in those classes and interfaces. The Export file 80 also contains a mapping of these program elements or items to tokens which can then be used to map names for imported items to tokens during package conversion. The export file does not expose private or proprietary details of the applets and associated libraries. Thereby, various separately developed applications can be loaded onto a resource limited device and share their components with each other without compromising private secure information. The Export file 80 does not expose private or proprietary elements and details of the applets and associated libraries, separately developed applications can be loaded onto the card 40 and share their exported elements with each other without compromising private secure information.

With reference to FIGS. 3 and 4, if a number of class files 70 comprising javacard.framework API 52 were being converted, the Export file 80 generated during conversion would allow other applet programs, being converted separately, to know which tokens to use in order to externally reference items of the javacard.framework.API. For instance, if an applet references the framework class PIN, the Export file 80 for the javacard.framework contains an entry for class javacard.framework.PIN along with its respective token. Converter 72 would place this token in the constant pool of the CAP file of the new applet, to represent an unresolved reference to that class in the framework. As explained further below, during applet execution, the token can be used to locate the referenced item in the export component 78 of the framework API package to retrieve the element link information. For example, the link information of a method may provide information to locate the appropriate method contained in the method component 80 of that package.

Figure 4B:
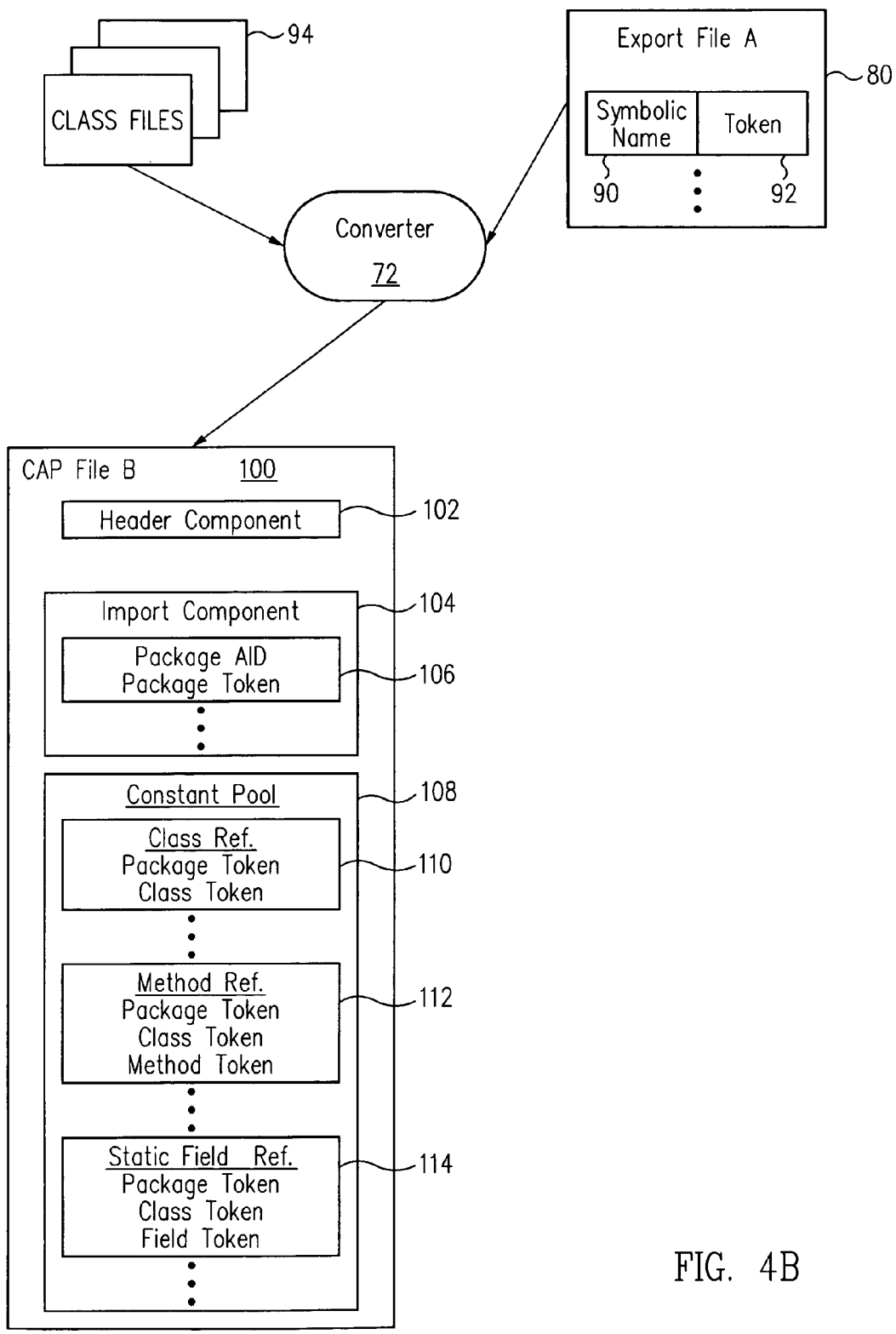

FIG. 4B shows converter 72 converting a second package of class files 94, where those class files 94 import elements from the class files from the first package 70 (FIG. 4A). For example, the second package can be a set of applet classes that rely upon certain classes contained, e.g., in a javacard.framework library package, that has been previously converted (as described above with respect to FIG. 4A). Converter 72 receives data input from class files 94 and from one or more Export files 80 from previously converted packages. Converter 72 generates a CAP file 100 suitable for downloading onto, e.g., the smart card 40.

CAP file B 100 for the second package includes an import component 104 with a list of all packages referenced by the applet classes. Each such external package reference comprises a mapping 106 between an internal package token and an external unique Application Identifier (AID) for that package. Each package token is used in other components within CAP file 100 to identify a particular referenced external package in a concise manner, thereby reducing the footprint size of the representation of the applet.

The CAP file 100 also has, among others, a header component 102, an import component 104 and a constant pool 108. The constant pool 108 includes one or more class references 110, which map each class reference with corresponding package tokens, and class tokens, thereby mapping the specified class to its corresponding external package and class within that package. The use of these tokens is further described below. The constant pool 108 can also include one or more method references 112 which similarly map each method reference with corresponding package tokens, class tokens and method tokens. The constant pool 108 can also include one or more field references 114, each with its package token, class token, and field token, respectively.

Generally, references to program elements or items are made indirectly through the constant pool 108 of each package. References to items in other packages are called external, and are represented in terms of tokens. References to items in the same CAP file are called internal, and can be represented either in terms of tokens, or in a different internal format (such as pointers to locations within the CAP file). For example, the external reference 110 to a class is composed of a package token and a class token. Together those tokens specify a certain class in a certain external package. An internal reference to a class may be a pointer to the class structure's location within the CAP file. Alternatively, the external token system can be used internally as well. The external references 112-114 refer to a static class member, either a field or method, with a package token, a class token, and a token for the static field or static method. An internal reference to a static class member may be a pointer to the item's location in the CAP file, but can also use the token system. References to instance fields, virtual methods and interface methods consist of a class reference and a token of the appropriate type. The class reference indicates whether the reference is external or internal.

External references in a CAP file can be resolved on a card from token form into the internal representation used by the Java Card virtual machine. A token can only be resolved in the context of the package which defines it. Just as the export file maps from a package's externally visible names to tokens, there is a set of link information for each package on the card that maps from tokens to resolved references. In this manner, the converter 97 processes both the class files 92 and Export file 94, creating an image suitable for downloading the applet onto a resource limited device and resolving references (linking) to the first package.

Figure 5:
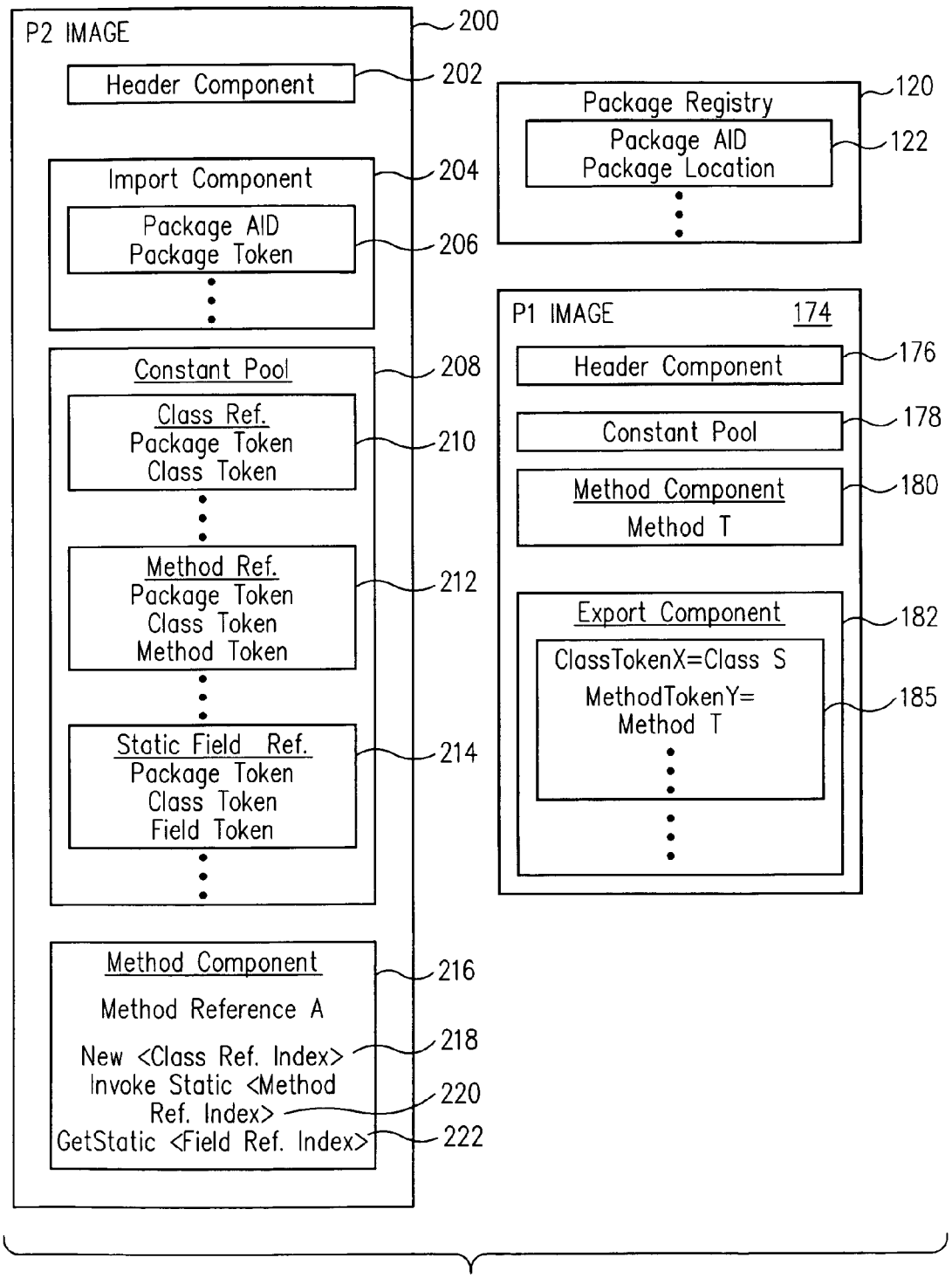
FIG. 5 is a diagram illustrating two packages and a package registry for resolving static references.
Figure 6:
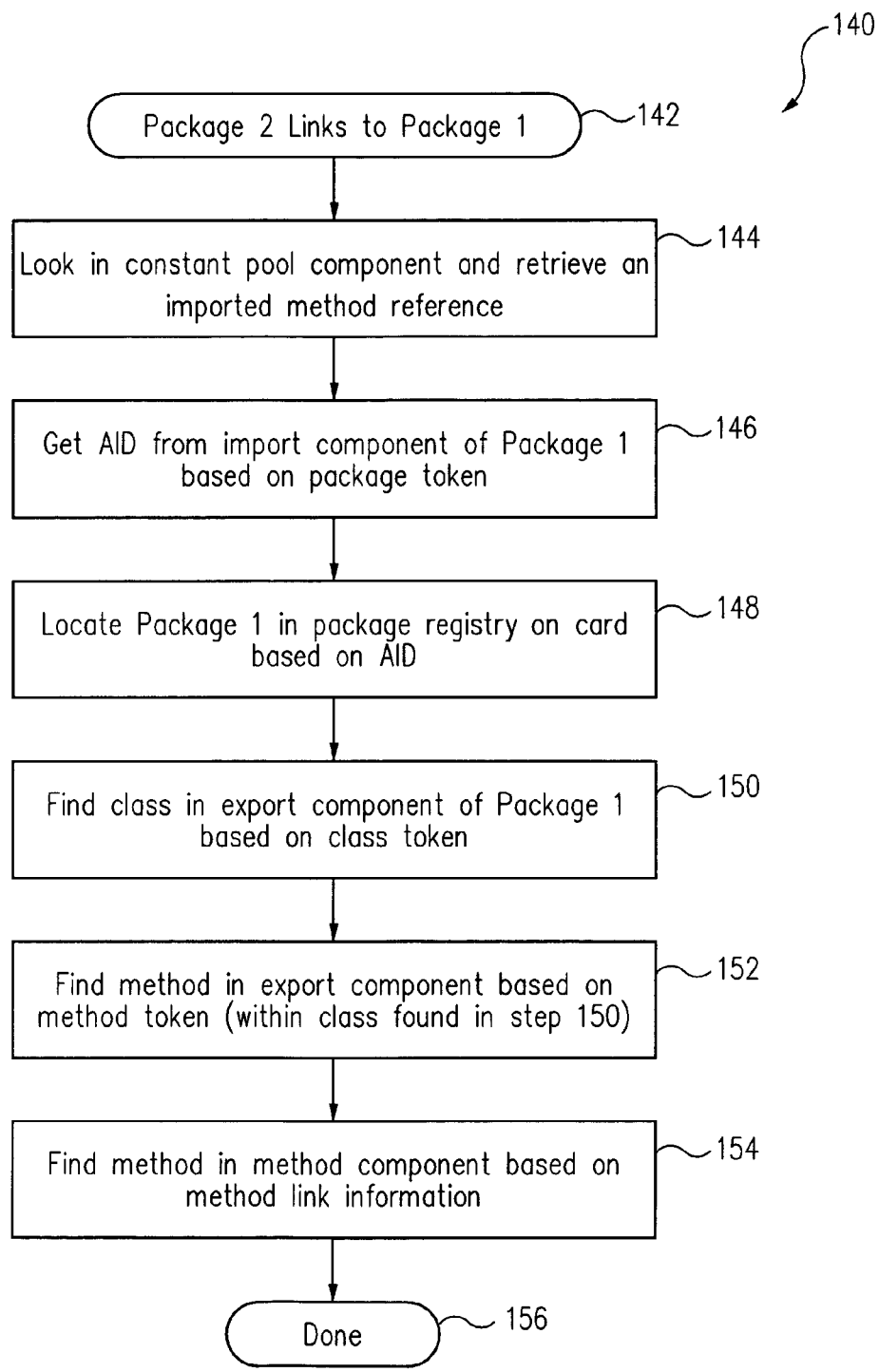
FIG. 6 is a flowchart illustrating a linking process in conjunction with the packages of FIG. 5.

After the pre-processing performed in FIGS. 4A and 4B, the CAP file of FIG. 4B may be downloaded to the smart card 40 or a resource constrained device that contains the CAP file of FIG. 4A. FIGS. 5 and 6 illustrate in greater detail how token-based linking is done for static elements on the smartcard 40 or a small device. The static elements include elements whose exact representations are identifiable by the converter during the conversion process.

In FIG. 5, an image 200 of a package P2 has been loaded from, e.g., CAP File B 100, onto card 40 and can be linked to a prior package P1 prior to or during execution. Program elements in package P2 200 may include references to methods and other data in external package P1 which already exists as an image 174 on card 40 (of CAP File A 74). The image 174 includes, among other things, a header component 176, a constant pool 178, a method component 180, and an export component 182 which contains a list of tokens for all exported static items 185. To aid the resolution of the reference to an external package, a package registry 120 is created on card 40 to provide information used to locate one or more external packages, including image 174 of package P1 which contains particular methods required by image 200 of the package P2.

The image 200 of the package P2 includes, among other things, a header component 202, an import component 204, a constant pool 208, and a method component 216, all corresponding to the respective components 102, 104, 108, and 116 in CAP file B 100. The general organization of these components is described above with respect to the CAP files and in Appendix A. Typically, the method component 216 will include program references such as "new" (218), "invokestatic" (220) and "getstatic_b" (222) along with their respective invoked class references, method references, and field references.

FIG. 6 shows a link process 140 for package P2 200 of FIG. 5. When an executing method in method component 216 invokes a particular method, e.g., Method T, in method component 180 that is located in an external package (package 1), linking is required (step 142). Using the index provided as an operand to the instruction, the process 140 locates and retrieves in constant pool 208 the matching method reference 212 (step 144). As described below, the method reference consists of a package token, class token, and method token which are used to locate that particular method in an external package. Next, process 140 examines the import component 204 to find the unique AID of external package P1 based on the retrieved package token (step 146). Package registry 120 is then examined to find the location of the package P1 based upon the AID (step 148). Once the image 174 for package P1 is found from package registry 120, export component 182 of image 174 is searched to locate the class with the specified class token (step 150). The program link information for the desired method, e.g., Method T, is then found by searching the list of methods associated with the particular class found in step 150, to locate the method with the specified method token (here method token Y corresponds to Method T of package P1 174) (step 152). Finally, the location of the specified method, e.g., Method T, in method component 180 is determined based on the link information provided for the method in the export component 182 (step 154).

Using the process of FIG. 6, a package may be downloaded onto a card and prepared for execution by a virtual machine. This process is called "installation." Various installation processes may be used which differ in the order of processing and linking operations (when the data is received on the card and when it is stored). These installation processes may be optimized based on available resources on the card. In one implementation, no linking occurs and as such, as data is received, it is immediately stored. During interpretation or execution of the code, resolution of external references occur. As such, this implementation is used in a larger (less constrained) small device because all temporary link information is stored permanently on this card.

As discussed above, instead of Unicode strings as are used in Java class files, tokens are used to identify items in a CAP file and to resolve references on the resource limited device. Tokens for an API are assigned by the API's developer and published in the package export file(s) for that API. Since the name-to-token mappings are published, an API developer may choose any order for tokens within constraints of the invention.

Together, FIGS. 5 and 6 describe resolution of references to static items, that is, classes, static fields, and static methods. The implementations of these items are fully locatable during compilation and conversion. In contrast, during compilation and conversion, references to instance fields, virtual methods and interface methods are not statically bound to particular implementations. Those items require additional information which is only available with reference to an instance at runtime. Reference resolution to these types are described in reference to FIG. 9A-9C.

Token assignments for virtual methods preserve relationships within object oriented class hierarchies. Tokens for virtual methods and interface methods are used as indices into virtual method tables and interface method tables, respectively. A particular card platform can resolve tokens into an internal representation that is most useful for that implementation of a resource limited device VM.

Some tokens may be resolved to indices. For example, an instance field token may be resolved to an index into a class instance. In such cases, the token value can be distinct from and unrelated to the value of the resolved index.

Each kind of item in a package has its own independent scope for tokens of that kind. Sample token range and assignment rules for each kind of reference are listed below. Other ranges and assignments of tokens can be made.

| Token Type | Range | Type | Scope |
| --- | --- | --- | --- |
| Package | 0-127 | Private | CAP file |
| Class (Including Interfaces) | 0-255 | Public | Package |
| Static Field | 0-255 | Public | Class |
| Static Method | 0-255 | Public | Class |
| Instance Field | 0-255 | Public or Private | Class |
| Virtual Method | 0-127 | Public or Private | Class Hierarchy |
| Interface Method | 0-127 | Public | Class |

Figure 7A:
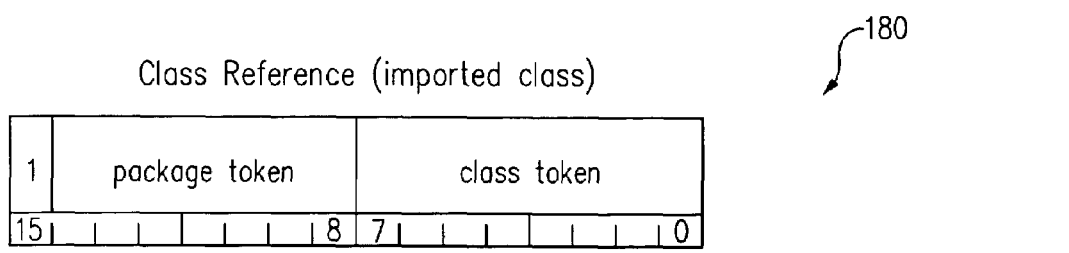
Figure 7B:
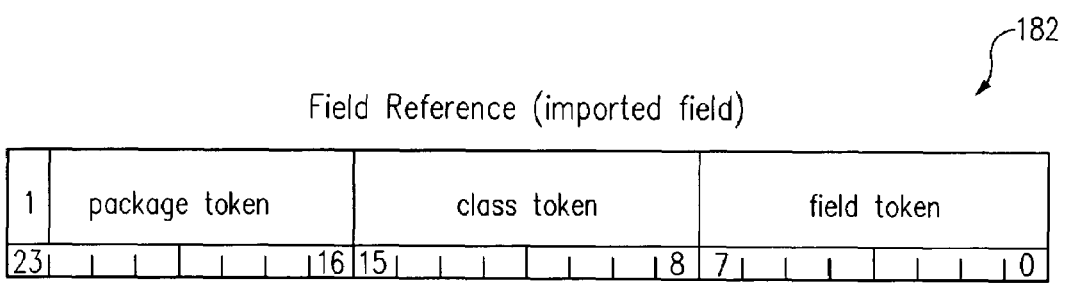
Figure 7C:
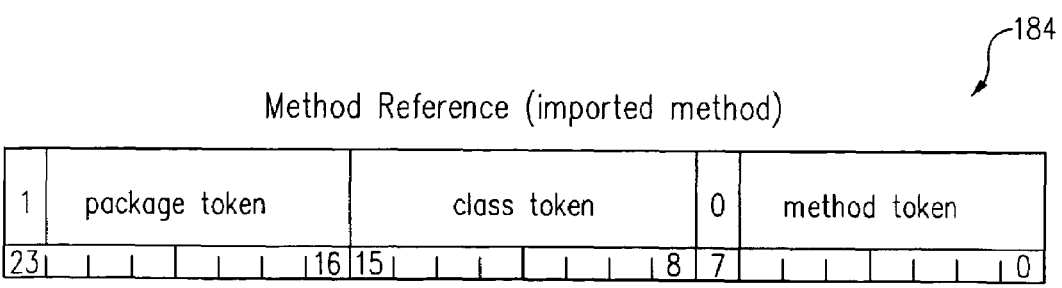

FIGS. 7A-7I are diagrams illustrating representations of references. FIGS. 7A-7C describe references to imported elements, while FIGS. 7D-7I describe references to internal items, some of which use tokens as well.

FIG. 7A shows a class reference to an external class 180. The class reference of FIG. 7A includes a package token and a class token. FIG. 7B shows a representation of an external field reference. The external field reference 182 includes a package token, a class token and a field token. FIG. 7C shows a representation of an external method reference 184. The external reference 184 includes a package token, a class token, and a method token. It is to be noted that, for virtual methods, the high bit of the method token is set to zero. The setting of the high bit indicates that the method is accessible outside of the defining package. The high bit may be the most significant bit such as the 7th bit of a byte, 15th bit of a word, or the 23rd bit of a three-byte unit.

The high bit of a package token is set to indicate an imported package. This is used to distinguish between external and internal references. As shown in FIGS. 7D-7I, references to internal elements have their high bits set to zero. The formats of FIGS. 7D-7I are examples of extending token usage, in selected cases, to internal items.

Figure 7D:
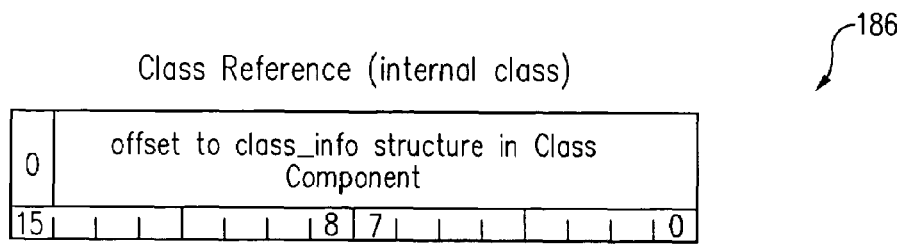
Figure 7E:
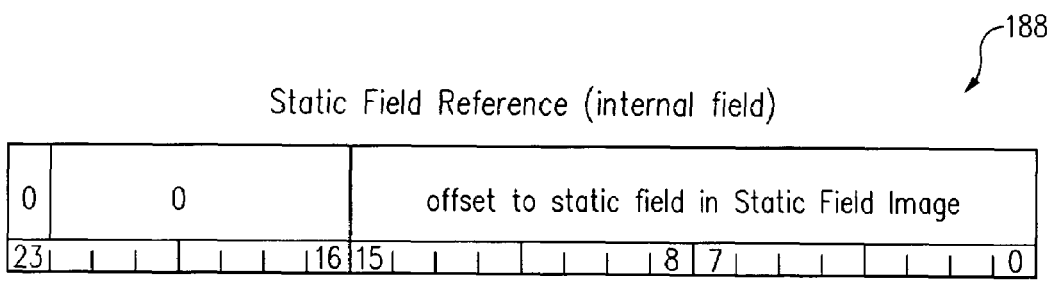
Figure 7F:
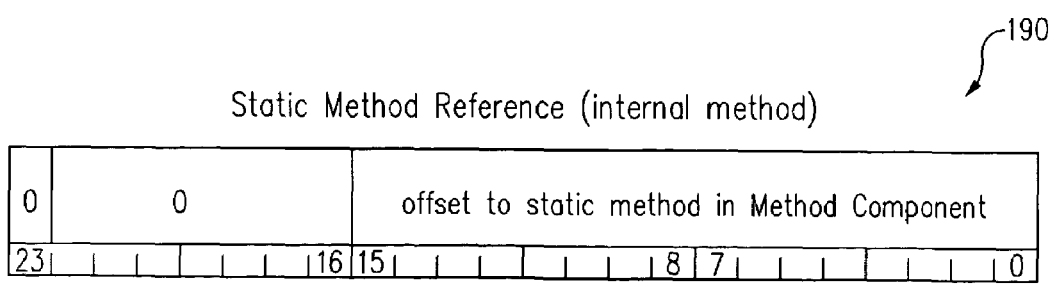

FIG. 7D shows a representation of an internal class reference 186. The internal class reference 186 includes an offset to a class information structure in the class component. FIG. 7E shows a representation of a static field reference 188 for an internal field. As such, the static field reference 188 has a field which is set to zero and a field for including an offset to a static field in the static field image. FIG. 7F is a representation of a static method reference 190 for internal methods. The static method reference 190 includes a field of padding, that is set to zero, to make the reference the same size as an imported method reference. The static method reference 190 also includes a field which provides information relating to an offset to a static method in the method component.

FIG. 7G shows a representation of an instance field reference 192 for an internal field. In FIG. 7G, the instance field reference 192 includes an offset to a class information structure in the class component, as well as a field token. FIG. 7H shows a virtual method reference 194 to a public or protected method for an internal method. The virtual method reference 194 includes an offset to a class information structure in the class component, a field which is cleared to indicate an externally accessible virtual method and to conform to the format in FIG. 7C. The virtual method reference 194 also includes a method token.

Finally, FIG. 7I shows a representation of a virtual method reference 196 to a package visible method for internal methods. The virtual method reference 196 includes an offset to the class information structure and the class component, a field which is set to one indicating that the reference's scope is internal to the package. The reference 196 also includes a method token.

Figure 8A:
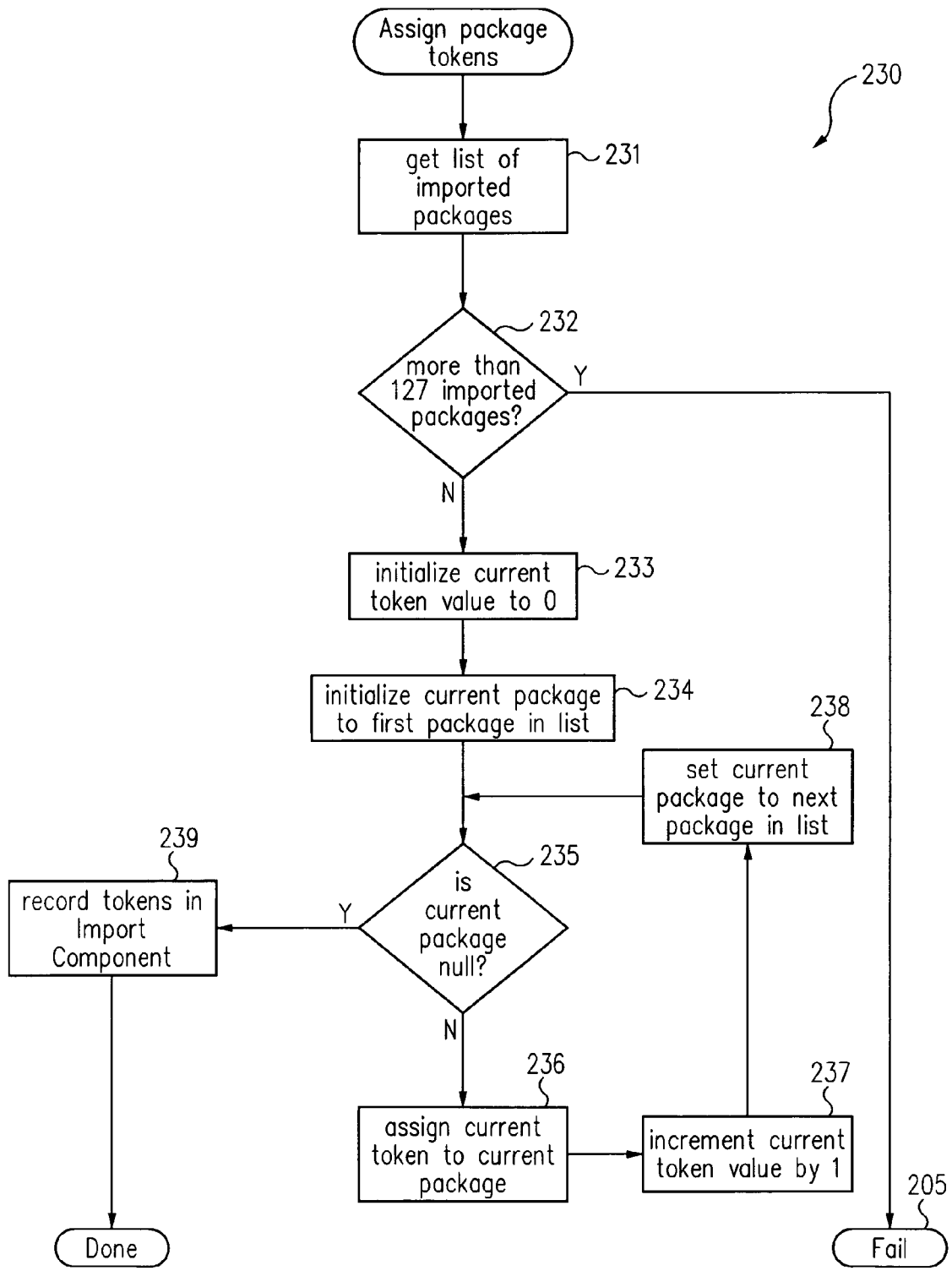
FIGS. 8A-8I are flowcharts illustrating processes for assigning tokens and supporting tables.

FIGS. 8A-8I are flowcharts illustrating processes for assigning tokens and constructing virtual method tables and interface method tables. These processes can be performed by a converter 72, as discussed above. Referring now to FIG. 8A, a process 230 for assigning package tokens is shown. Generally, package references from within a CAP file are assigned tokens which are used only in the CAP file.

The process 230 first obtains a list of imported packages (step 231). The list can be in any order. Next, the process 230 checks whether the number of packages being imported exceeds a predetermined threshold such as 127 (step 232). In this case, a limit of 127 is used in order to represent a package token in 8-bits, with the high bit reserved. If the number of imported packages exceeds the predetermined threshold such as 127, the process fails (step 205).

Alternatively, the process 230 initializes the current token value to zero (step 233). Next, the process 230 initializes the current package to the first package in the list (step 234). The process 230 then checks whether the current package is null (step 235). If not, the process 230 assigns the current token to the current package (step 236). Next, the process 230 increments the current token value by one (step 237), and sets the current package to the next package in the list (step 238).

From step 235, in the event that the current package is null, indicating there are no more imported packages, the process 230 records the token in an Import component (step 239) and exits. References to items in imported packages use token values recorded in the imports component.

Figure 8B:
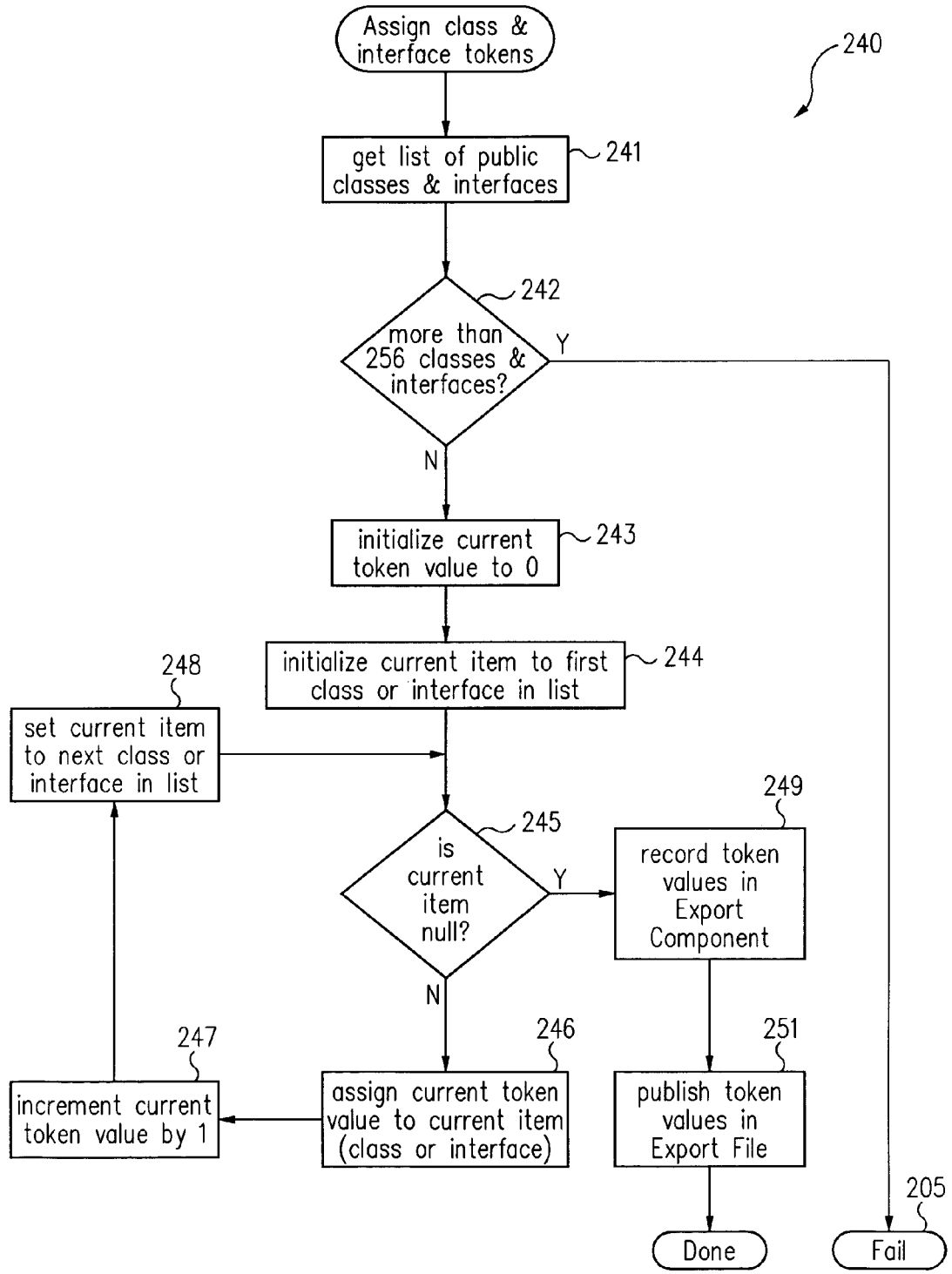

Turning now to FIG. 8B, a process 240 for assigning class and interface tokens is shown. The process 240 first obtains an arbitrarily ordered list of public class and interfaces (step 241). Next, it checks whether the number of classes and interfaces exceed a predetermined value such as 256 which is the maximum number of classes that can be represented in 8-bits (step 242). If so, the process 240 fails (step 205). Alternatively, the process 240 initializes the current token value to zero (step 243). It also initializes the current item to the first class or interface in the list obtained in step 241 (step 244). Next, the process 240 determines whether the current item is null which indicates that no more classes or interfaces remain in the list (step 245). If not, the process 240 assigns a current token value to the current item, which may be a class or an interface item (step 246). Next, the process 240 increments the current token value by one (step 247) and sets the current item to the next class or interface in the list (step 248) before looping back to step 245. From step 245, in the event that a current item is null, indicating no more classes or interfaces exist in the list, the process 240 records a token value in the Export component table (step 249). Additionally, the process 240 publishes the token values in the export file (step 251) and exits.

Figures 1, 8C:
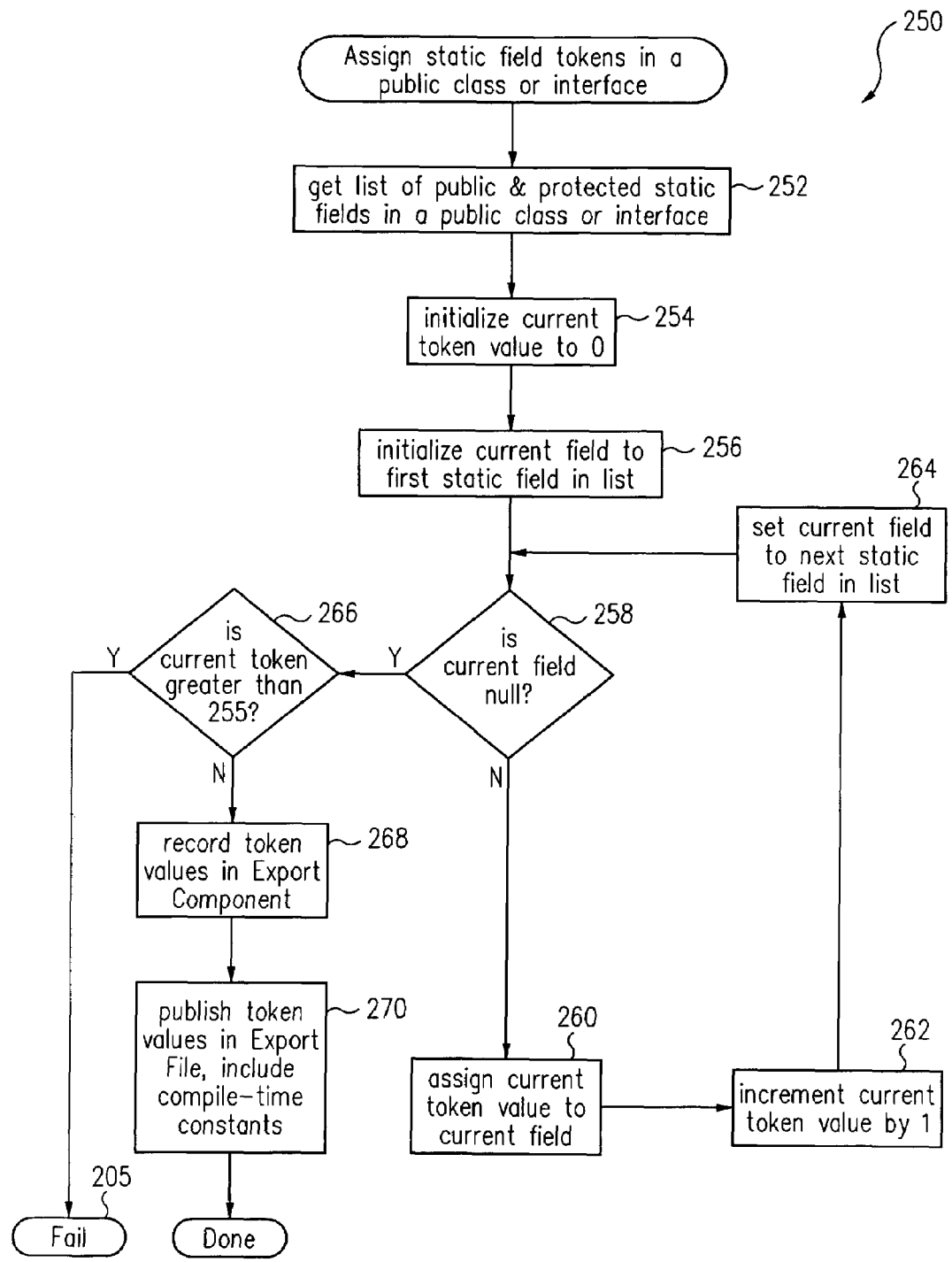
Figures 2, 8C:
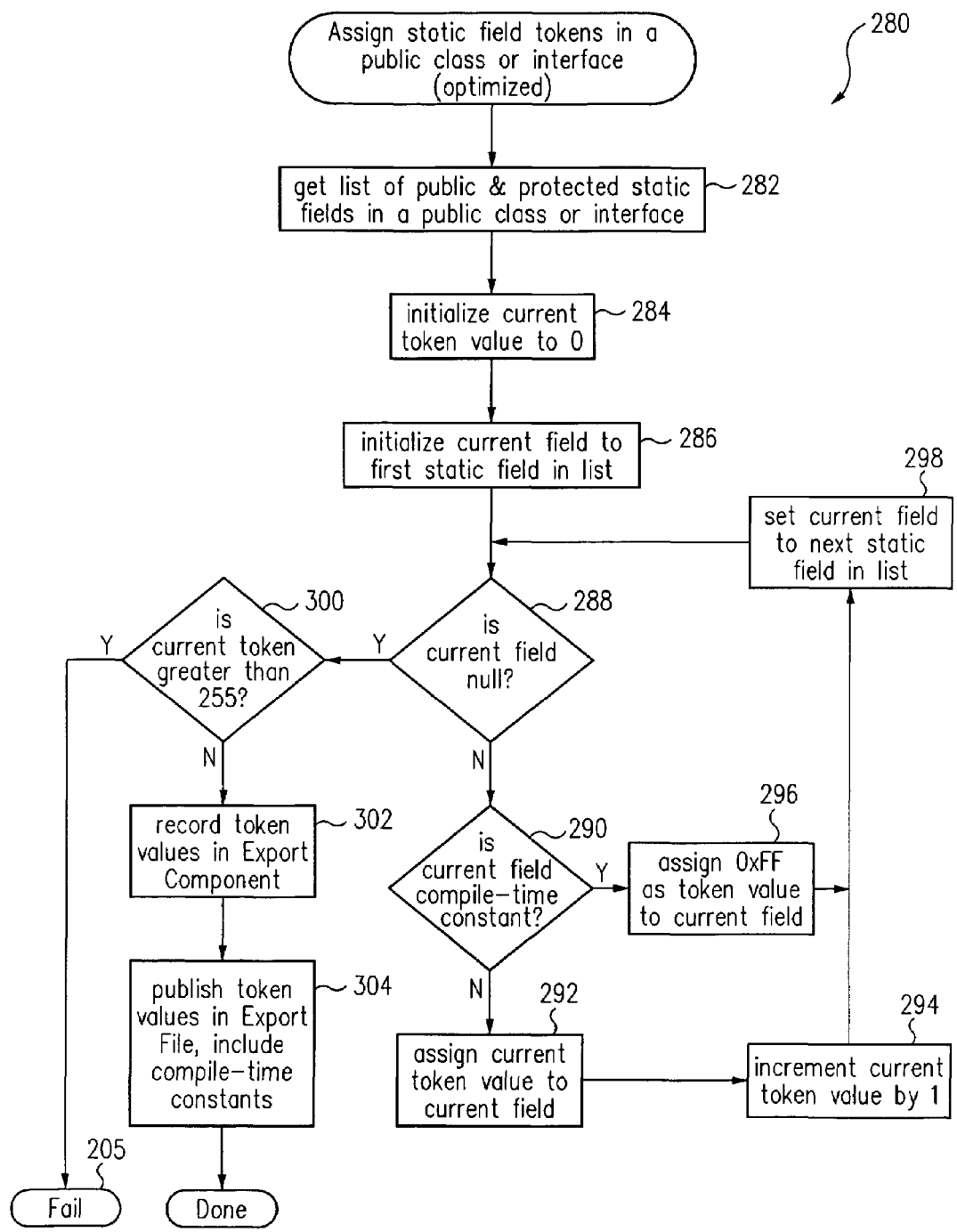

FIGS. 8C-1 and 8C-2 handle the static field tokens, with FIG. 8C-2 being an optimized version of FIG. 8C-1 by inlining compile-time constants. Externally visible static fields in a package are assigned public tokens. Package-visible and private static fields are not assigned tokens. FIG. 8C-2 describes a process 280 which is an optimization of process 250. In this optimization, tokens are not assigned for final static fields which are initialized to compile-time constants. In this case, the fields are not linked on-card.

Turning now to FIG. 8C-1, a process 250 is shown for assigning static-field tokens in a public class or interface. The process 250 first obtains an arbitrarily ordered list of public and protected static fields in the public class or interface (step 252). Then the process 250 sets the current token value to zero (step 254) and initializes the current field to the first static field in the list (step 256). The process 225 then determines whether the current field is null, indicating no more fields are left (step 258). If not, the process 250 assigns the current token value to the current field (step 260) and increments the current token value by one (step 262). The process 250 then sets the current field to the next static field in the list (step 264) before it loops back to step 258.

From step 258, in the event that the current field is null, indicating no more fields are left, the process 250 determines whether the current token is greater than a predetermined value such as 255 which is the maximum number of tokens that can be represented in 8-bits (step 266). If so, the process 250 fails (step 205). Alternatively, the process 250 records the token values in the export component table if the export component is to be generated (step 268). Finally, the process 250 publishes the token values in the export files (step 270).

Referring now to FIG. 8C-2, a process 280 which optimizes the assignment of static field tokens in a public class or interface is shown. The optimization reduces memory consumption by eliminating compile-time constants and replacing references to the constants inline in the bytecode. The process 280 obtains a list of public and protected static fields in a public class or interface (step 282). The process 280 then sets the current token value to zero (step 284) and initializes the current field to the first static field in the list (step 286). The process 280 then checks whether the current field is null (no more fields) (step 288). If not, the process 280 determines whether the current field is a compile-time constant (step 290). If so, the process 280 assigns a value such as 0xFF as a token value of the current field (step 296). Alternatively, if the current field is not a compile-time constant, the process 280 assigns a current token value to the current field (step 292) and increments the current token value by one (step 294). From step 294 and 296, the process 280 then sets the current field to the next static field in the list (step 298) before looping back to step 288 to continue processing the tokens.

From step 288, in the event a current field is null (no more fields), the process then checks whether the current token exceeds a predetermined threshold such as 255 which is the maximum numbers that can be represented using 8-bits (step 300). If so, the process 280 fails (step 205). Alternatively, if exporting, the process 280 records the token values in the export component (step 302). The process then publishes the token values in the Export file with the compiled time constants (step 304) so referencing packages can inline the respective values, before exiting.

Figure 8D:
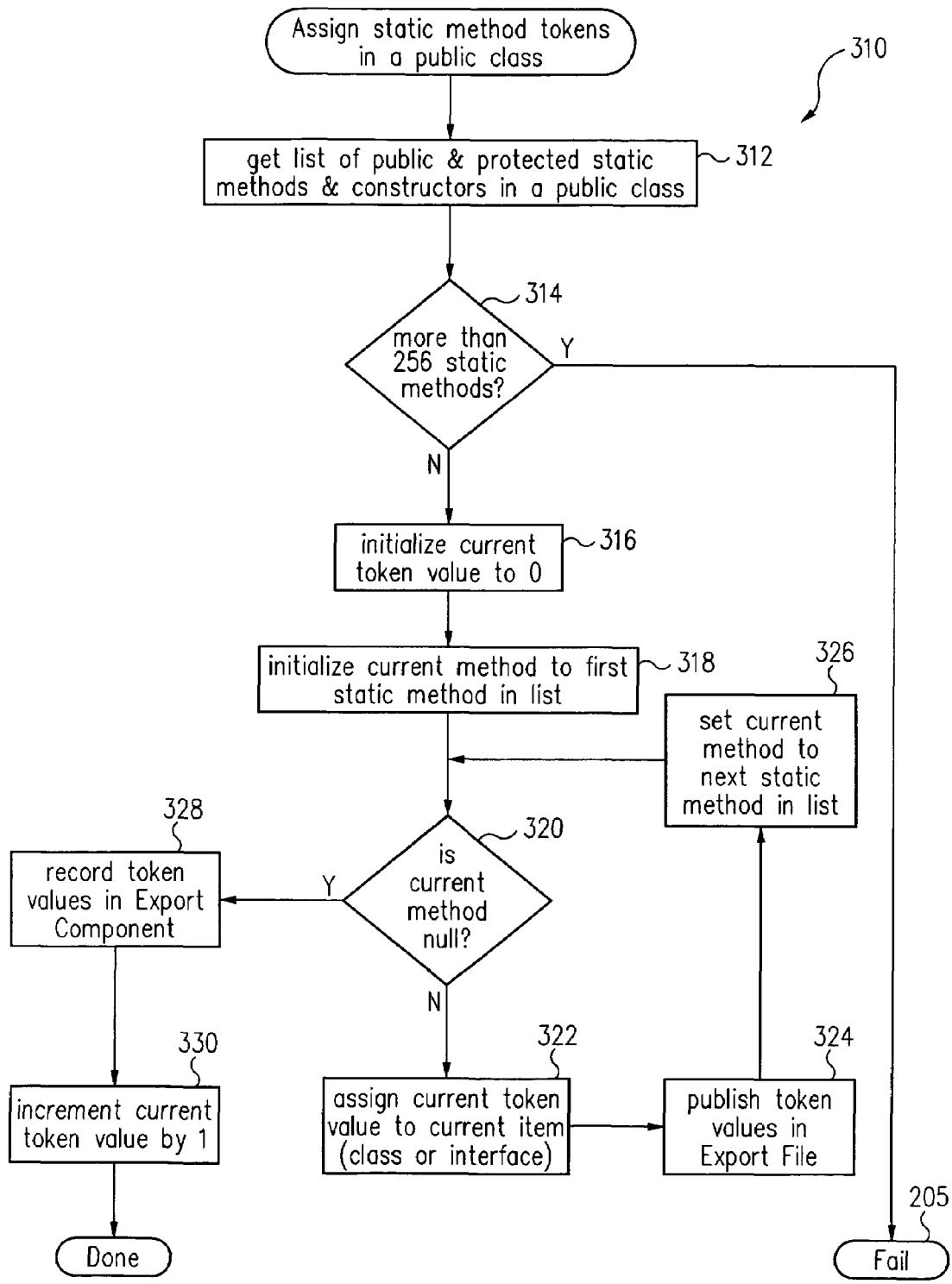

Turning now to FIG. 8D, a process 310 for assigning static method tokens in a public class is shown. The process 310 first obtains a list of public and protected static methods and constructors in a public class (step 312). The process 310 then checks whether the number of static methods exceed a predetermined value such as 256 (step 314). If not, the process sets the token value to zero (step 316) and initializes the current method to the first static method in the list (step 318). Next, the process 310 checks whether the current method is null (no more methods) (step 320). If not, the process 310 assigns a current token value to the current static method (step 322) and increments the current token value by one (step 324). The process 310 then sets the current method to the next static method in the list (step 326) before looping back to step 320.

From step 320, if the current method is null (no more methods) the process records the token value in the export component (step 328) and publishes the token values in the export file (step 330) before exiting.

Figures 1, 8E:
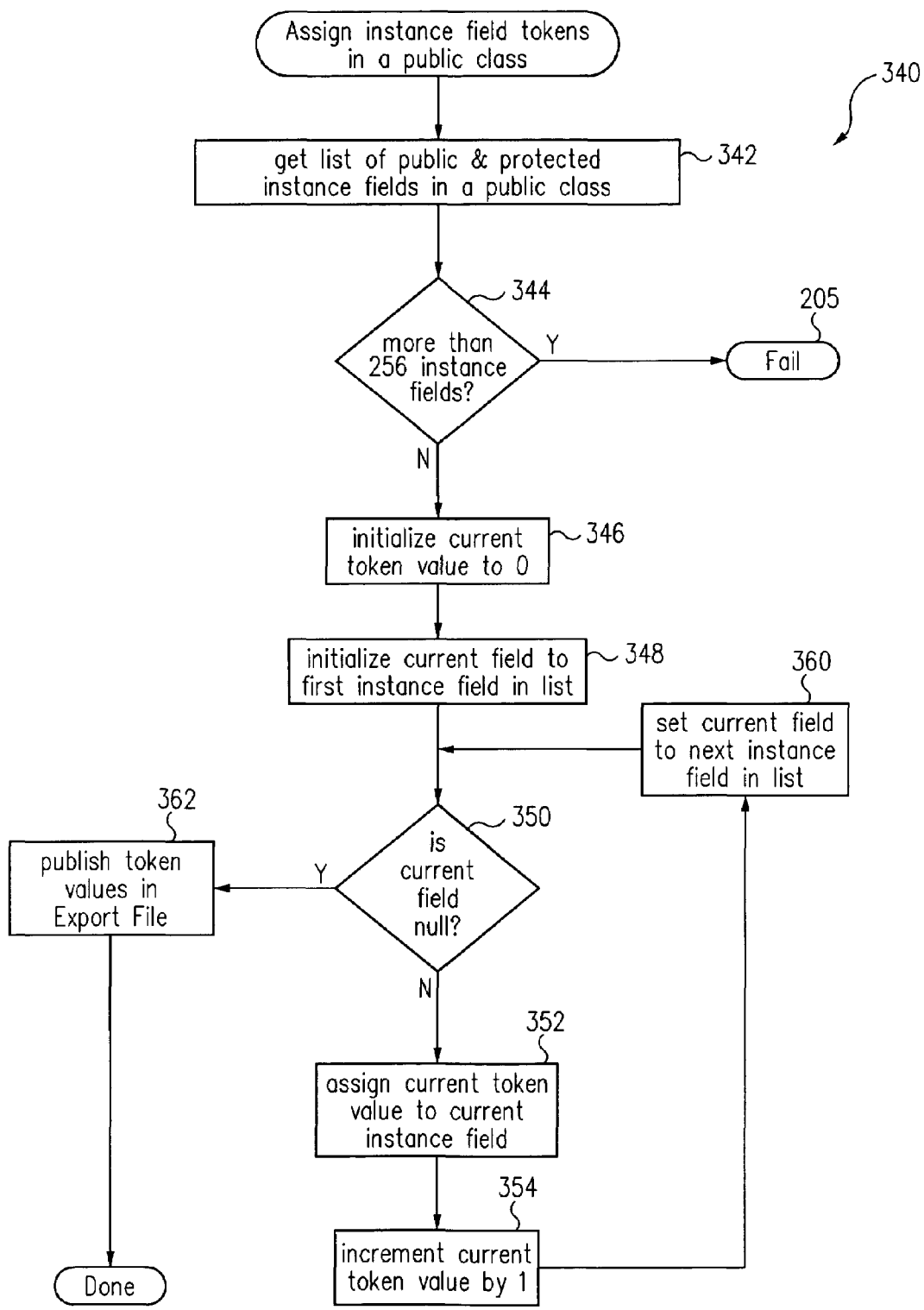
Figures 2, 8E:
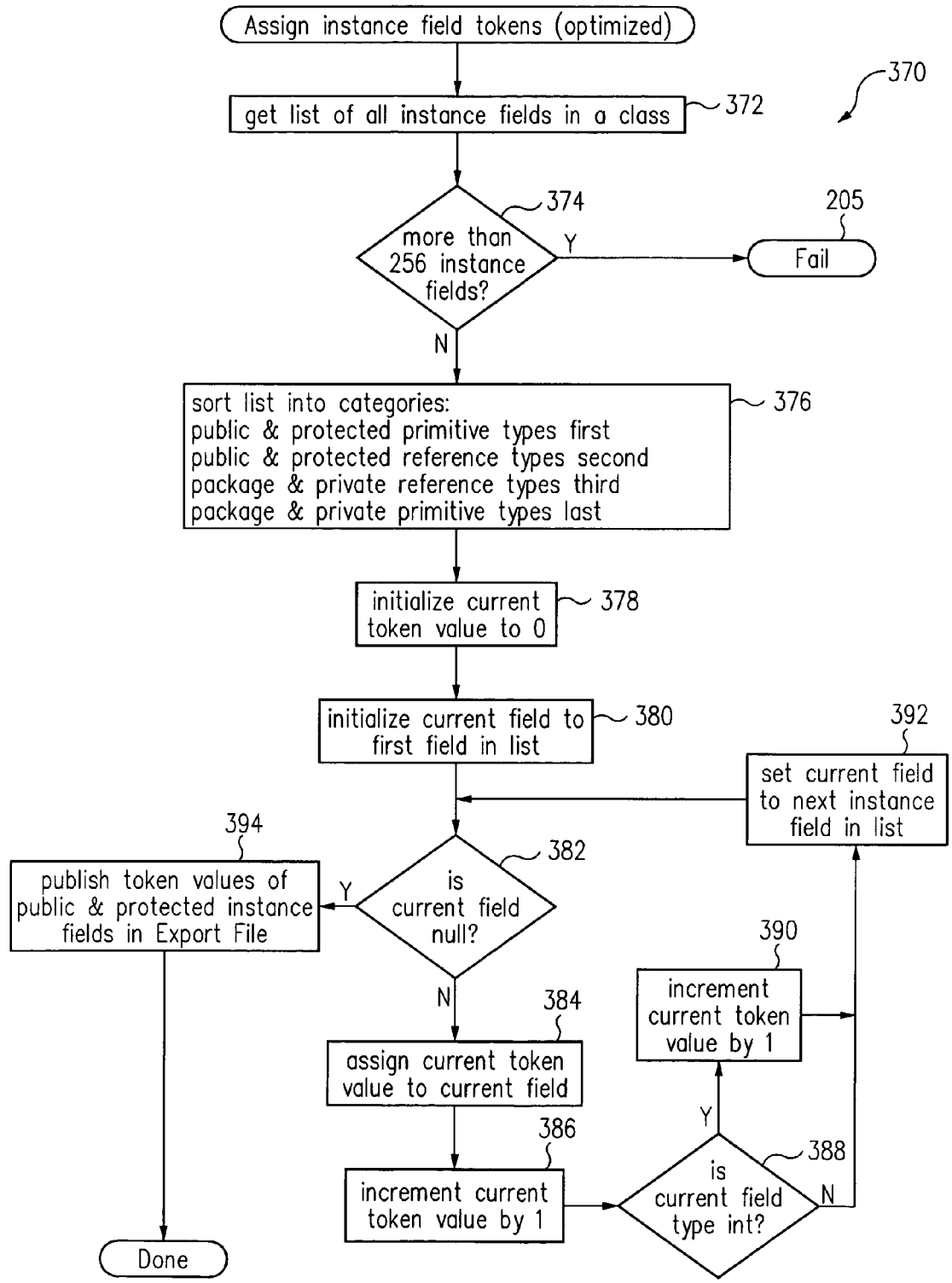

FIGS. 8E-1 and 8E-2 relate to instance field token assignment schemes. FIG. 8E-1 shows a general process for assigning field tokens, while FIG. 8E-2 is one optimized process which extends token assignments to internal (or package-visible and private) fields, groups fields of type reference and allows tokens to be easily mapped to offsets within instances.

Turning now to FIG. 8E-1, a process 340 for assigning instance field tokens in a public class is shown. First, the process 340 gets a list of public and protected instance fields in a public class (step 342). It then checks whether the number of instance fields exceeds a predetermined value such as 256 (step 344) and if so, fails (step 205). Alternatively, the process 340 sets the current token value to zero (step 346) and initializes a current field to the first field in the list (step 348). Next, the process 340 checks whether the current field is null (step 350). If not, the process 340 assigns a current token value to the current instance field (step 352) and increments the current token value by one (step 354). From step 354, the process sets the current field to the next instance field in the list (step 360) before looping back to step 350. From step 350, in the event that the current field is null, the process 340 publishes the token values in the export file (step 362) and exits.

Various factors may be considered in optimizing the general approach of FIG. 8E-1. Generally, the ordering of the tokens remains flexible so that the token arrangement can be adapted to specific implementations. FIG. 8E-2 describes a constrained assignment scheme as shown in the example below:

| Visibility | Category | Type | Token |
| --- | --- | --- | --- |
| public and protected = public tokens | primitive | boolean | 0 |
| | | byte | 1 |
| | | short | 2 |
| | references | byte[ ] | 3 |
| | | Applet | 4 |
| package and private = private tokens | references | short[ ] | 5 |
| | | Object | 6 |
| | primitive | int | 7 |
| | | short | 9 |

Referring now to FIG. 8E-2, a process 370 for optimizing the above assignment of instance field tokens is shown. As before, the process 370 gets a list of all instance fields in a class (step 372). Next, the process 370 checks whether the numbered instance fields exceeds a predetermined value such as 256 (step 374). If so, the process 370 fails (step 205) and if not, the process 370 sorts the list into categories including public and protected primitive types first, public and protected reference types second, package and private reference types third, and package and private primitive types last (step 376). The token value is set to zero (step 378) and the current field is initialized to the first instance field in the list (step 380). Next, the process 370 checks whether the current field is null (step 382). If not, the process assigns a current token value to the current field (step 384) and increments the current token value by one (step 386). The process 370 then determines whether the current field is an integer type (step 388). The integer type takes two slots to allow tokens to be easily mapped to instances. If so, the current token value is incremented by one (step 390). From step 388 or step 390, the process 370 sets the current field to the next instance field in the list (step 392) before looping back to step 382.

From step 382, if the current field is null, the process 370 publishes the token values of the public and protected instance fields in the export file (step 394) before exiting.

Figures 1, 8F:
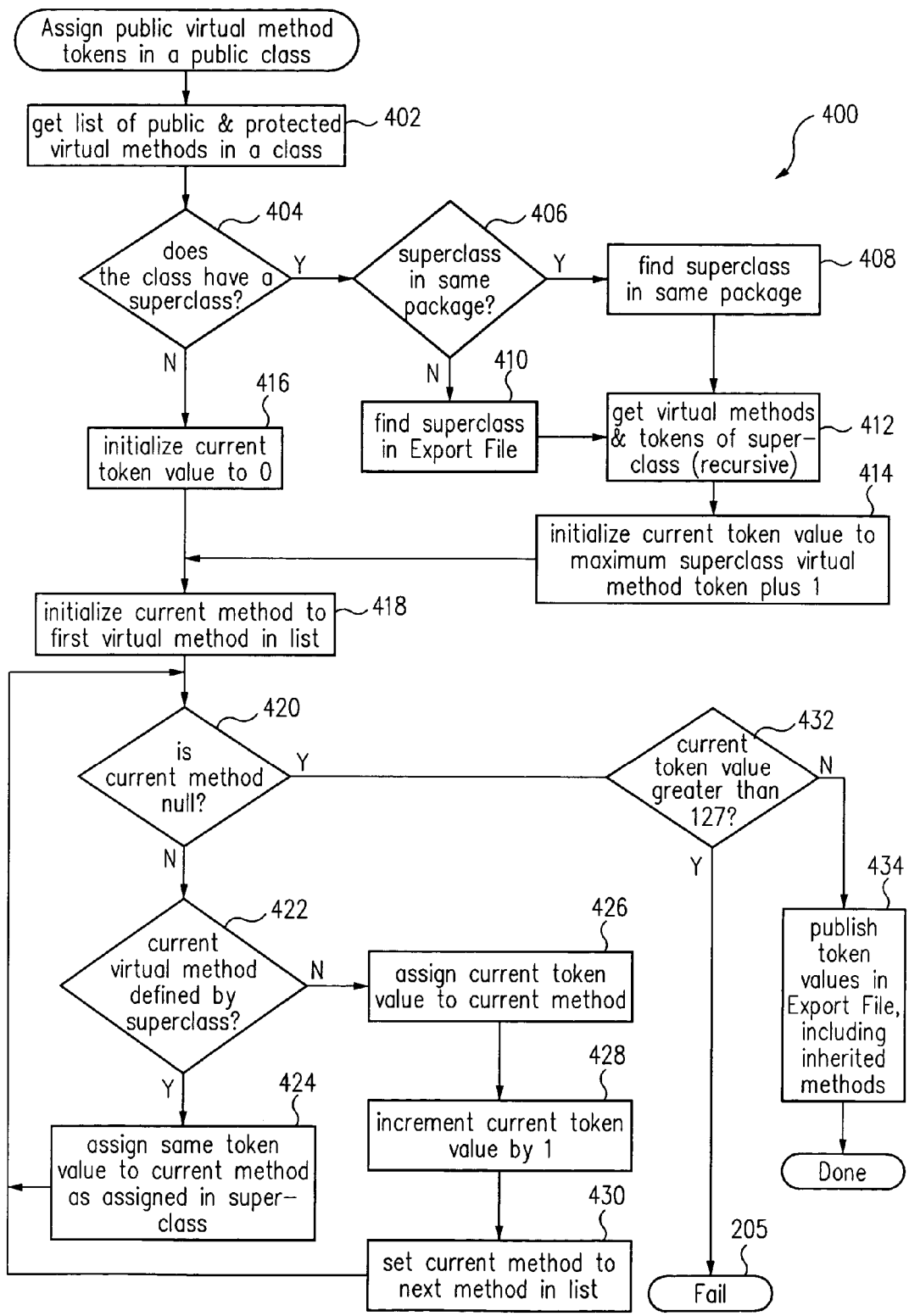
Figures 2, 8F:
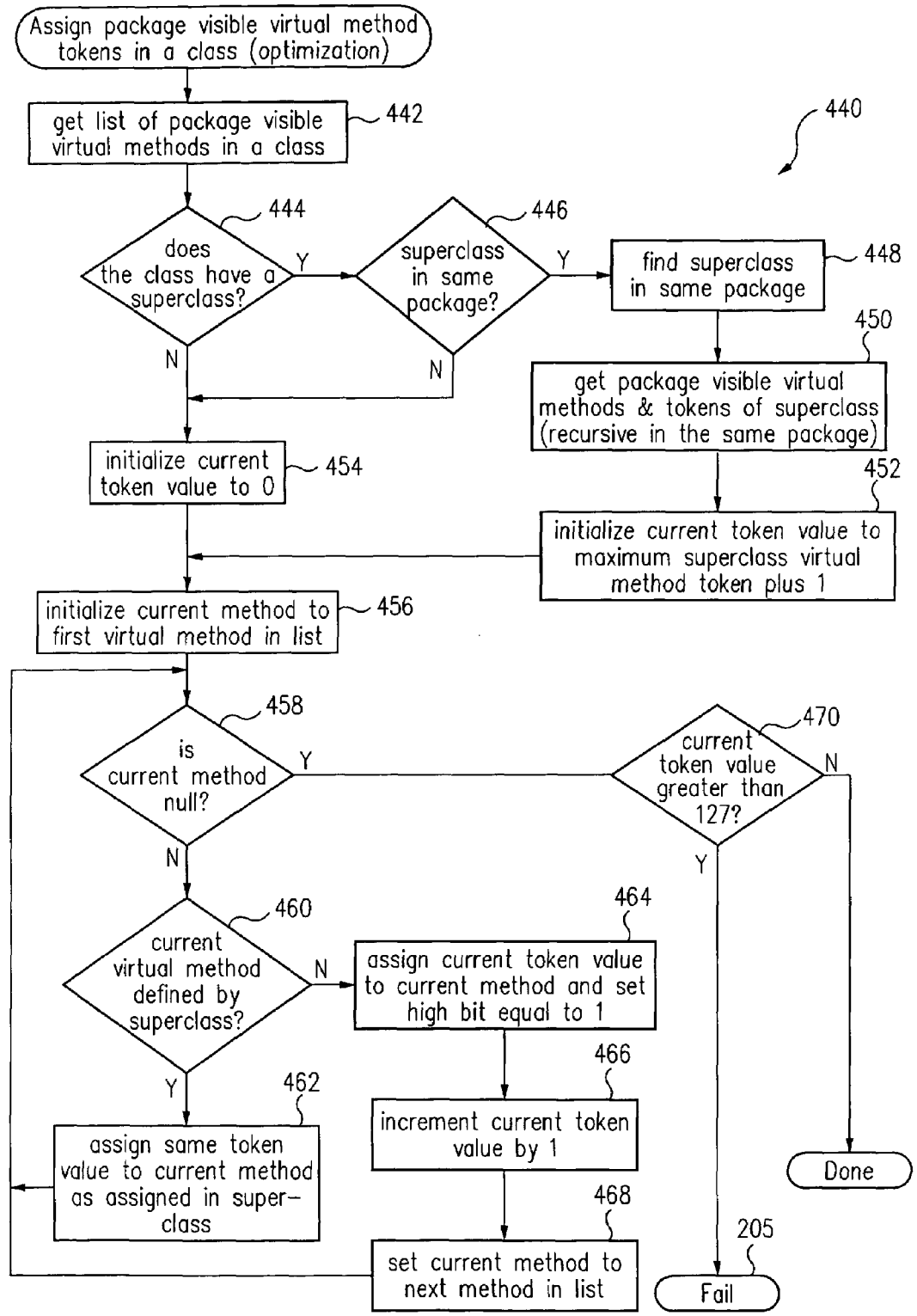

FIGS. 8F-1 and 8F-2 assign tokens for virtual methods. FIG. 8F-1 shows a general scheme for virtual method token assignment, while FIG. 8F-2 extends token assignment to package visible virtual methods.

Referring now to FIGS. 8F-1 and 8F-2, processes for assigning virtual method tokens are shown. Generally, virtual methods defined in a package are assigned either exportable or internal tokens. Exportable tokens are assigned to public and protected virtual methods; in this case, the high bit of the token is zero. Internal tokens are assigned to package visible virtual methods; in this case the high bit of the token is one. Since the high bit is reserved, these tokens range from 0 to 127, inclusive.

Exportable tokens for the externally visible introduced virtual methods in a class are numbered consecutively starting at one greater than the highest numbered exportable virtual method token of the class's superclass. If a method overrides a method implemented in the class's superclass, that method uses the same token number as the corresponding method in the superclass so that overridden methods may be identified as being related to the method they override.

Internal virtual method tokens are assigned differently from exportable virtual method tokens. If a class and its superclass are defined in the same package, the tokens for the package-visible introduced virtual methods in that class are numbered consecutively starting at one greater than the highest numbered internal virtual method token of the class's superclass. If the class and its superclass are defined in different packages, the tokens for the package-visible introduced virtual methods in that class are numbered consecutively starting at zero. If a method overrides a method implemented in the class's superclass, that method uses the same token number as the corresponding method in the superclass. For background information, the definition of the Java programming language specifies that overriding a package-visible virtual method is only possible if both the class and its superclass are defined in the same package. The high bit of the byte containing a virtual method token is always set to one, to indicate it is an internal token. The ordering of introduced package virtual method tokens in a class is not specified.

In FIG. 8F-1, the process 400 first gets a list of public and protected virtual methods in a class (step 402). The process 400 then checks whether the class has a superclass (step 404). If so, the process 400 further checks whether the superclass is in the same package (step 406). From step 406, in the event that the superclass is in the same package, the process finds the superclass (step 408) and obtains the virtual methods and tokens of the superclass (step 412). The set of virtual method includes those defined all of the superclasses of the superclass. From step 406, in the event of the superclass is not in the same package, the process 400 finds the superclass in the export file of the imported package (step 410) and then proceeds to step 412. From step 412, the process 400 initializes a current token value to the maximum superclass virtual method token and increments its value by one (step 414), ensuring that there will not be token collisions within the hierarchy.

From step 404, in the event that the class does not have a superclass, the process 400 initializes to zero the current token value (step 416). From step 414 or step 416, the process 400 initializes the current method to the first virtual method in the list (step 418). Next, the process 400 determines whether the current method is null (step 420). If not, the process then determines whether the current virtual method is defined by the superclass (step 422). If so, the method is an override method and the same token value is assigned to the current method as the one assigned to the overridden method in the superclass (step 424) before looping back to step 420.

From step 422, in the event that the current virtual method is not defined by the superclass, it is an introduced method. In that case, the process 400 assigns a current token value to the current method (step 426) and increments the current token value by one (step 428). The process 400 then sets the current method to the next method in the list (step 430) before looping back to step 420. From step 420, in the event that the current method is null, the process 400 checks whether the current token value exceeds a predetermined value such as 127 (step 432). If so, the process 400 fails (step 205). Alternatively, if the token value is not greater than 127, the process 400 publishes the token values in the export file along with the inherited methods and their token values (step 434) before exiting. The process of FIG. 8F-1 can also be used for assigning tokens to public and protected virtual methods in a package visible class as shown in FIG. 8F-2.

In FIG. 8F-2, a process 440 for extending token assignment to package visible virtual methods in a class is shown. The process 440 first gets a list of package visible virtual methods in the class (step 442). Next, it checks whether the class has a superclass (step 444). If so, the process then checks whether the superclass is in the same package (step 446). If so, the process 440 then finds a superclass in the same package (step 448), gets the package visible virtual methods and tokens of the superclass (step 450) and initializes the current token value to the maximum superclass virtual method token plus one (step 452) to avoid token collisions within the hierarchy that is scoped to the package. This ensures that token values previously assigned within superclasses are not reused for introduced methods. It is to be noted that step 450 may be recursive up to the superclasses in the same package.

From step 444, in the event a class does not have a superclass, or from step 446, in the event that the superclass is not in the same package, the process 440 sets the current token value to zero (step 454). Particularly, if the superclass is not in the same package, package visible virtual methods of that superclass are not accessible and thus not included in step 454. These potential methods are accounted for when resolving references to virtual methods as described above in FIGS. 9D-2 and 9D-3.

From step 452 or step 454, the process 440 initializes the current method to the first virtual method in a list (step 456). Next, the process 440 checks whether the current method is null (step 458). If not, the process 440 checks whether the current virtual method is defined by a superclass (step 460). In this case the method is an override method. If so, the process 440 then assigns the same token value to the current method as assigned to the overriden method in the superclass (step 462) before looping back to step 458.

From step 460, if the current virtual method is not defined by its superclass it is an introduced method. In this case, the process 440 assigns a current token value to the current method and sets the high bit to one (step 464). The high bit of the virtual method token is used to determine whether it is a public or private virtual method token. Next, the process 440 increments the current token value by one (step 466) and sets the current method to the next method in the list (step 468) before looping back to step 458.

In step 458, in the event that the current method is null, the process 440 determines whether the current token value exceeds a value such as 127 (which is the maximum number representable in 8-bits with the high bit reserved) in step 470. If so, the process 440 fails (step 205). Alternatively, in the event that the current token value is within range, the process 440 exits. Note that tokens for package visible virtual methods are used internally and are not exported.

Figures 1, 8G:
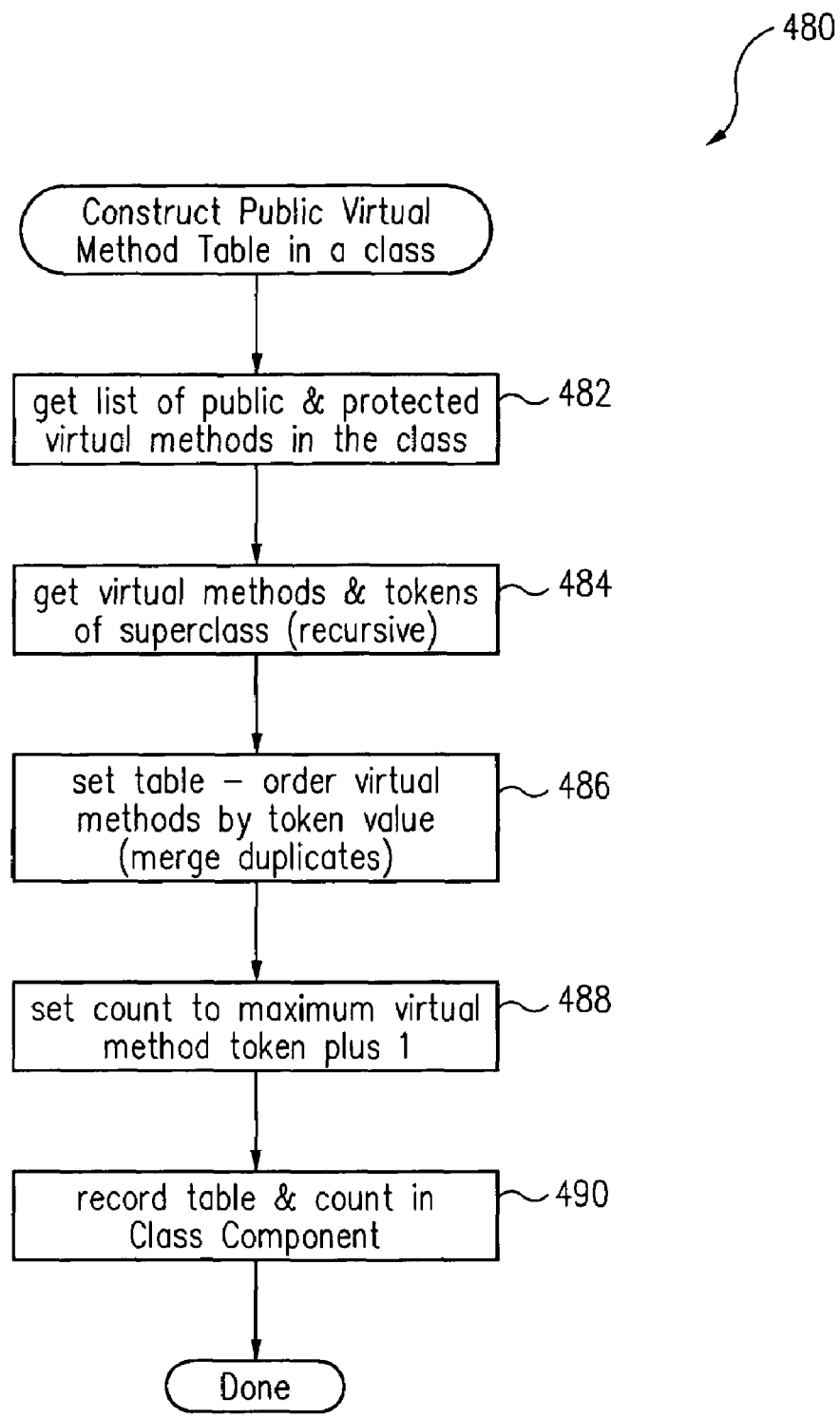
Figures 2, 8G:
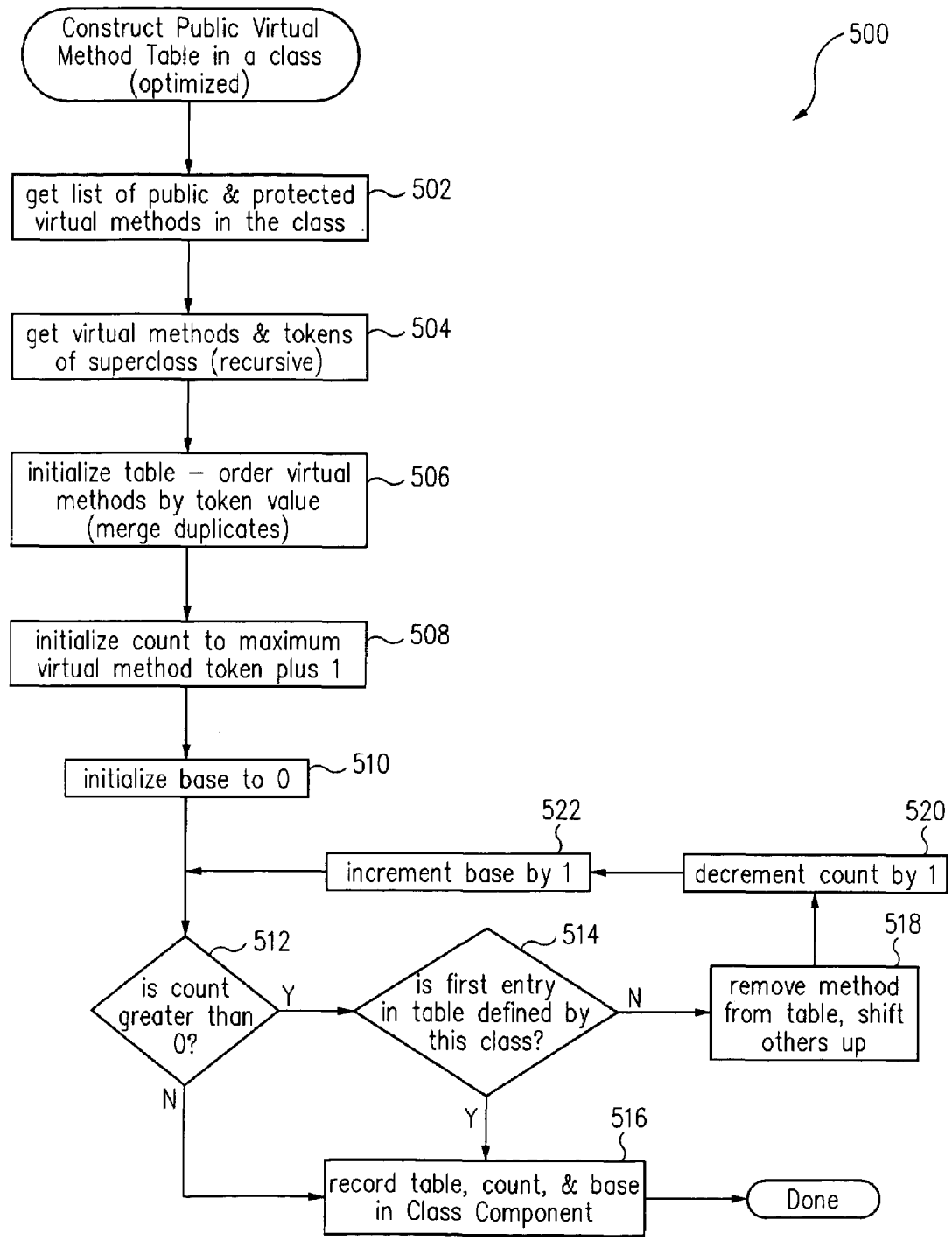

Virtual method references can only be resolved during execution. The virtual method table allows the card to determine which method to invoke based on the token as well as instances of the method's class. The token value is used as an index to the virtual method table. FIG. 8G-1 shows a process 480 for constructing public virtual method tables in a class. First, a list of public and protected virtual methods in the class is obtained (step 482). Next, the process 480 gets virtual methods and tokens of a superclass (step 484). Step 484 is recursive, including all of the superclasses of the class. The process 480 then creates a table, ordering virtual methods by token values (step 486) and eliminates duplicate virtual methods. Duplicates are generated for overridden methods. In this case, the method defined in the current class is represented in the method table instead of the one defined in a superclass. The process 480 then sets a count to a maximum virtual method token class in step 488 and records a table and count in the class component (step 490) before exiting.

Turning now to FIG. 8G-2, a process 500 which optimizes the construction of public virtual method tables in the class is shown. The process 500 decreases the size required for storing a virtual method table by removing overlapping elements in a superclass' virtual method table.

The process 500 first gets a list of public and protected virtual methods in a class (step 502). Next, the virtual methods and tokens of the superclass are obtained (step 504). Step 504 is recursive, including all of the superclasses of the class. Next, the process 500 initializes a table by ordering virtual methods obtained in steps 502 and 504 by token values (step

506). This process assumes the process has at least one entry. The process 500 then initializes a count to a maximum virtual method token plus one (step 508). The process 500 also sets the base count to zero (step 510). Next, process 500 checks whether the count is positive (step 512). If so, the process checks whether the first entry in the table is defined by the current class (step 514). If not, the process removes the method from the table and shifts the remaining methods up in the table (step 518). The process 500 then decrements the count by one (step 520) and increments the base count by one (step 522) before looping back to step 512.

From step 514, in the event that the first entry is defined in the current class, or in the event that the count is zero in step 512, the process 500 proceeds to record the table, count and base in the class component (step 516) before exiting.

Figures 1, 8H:
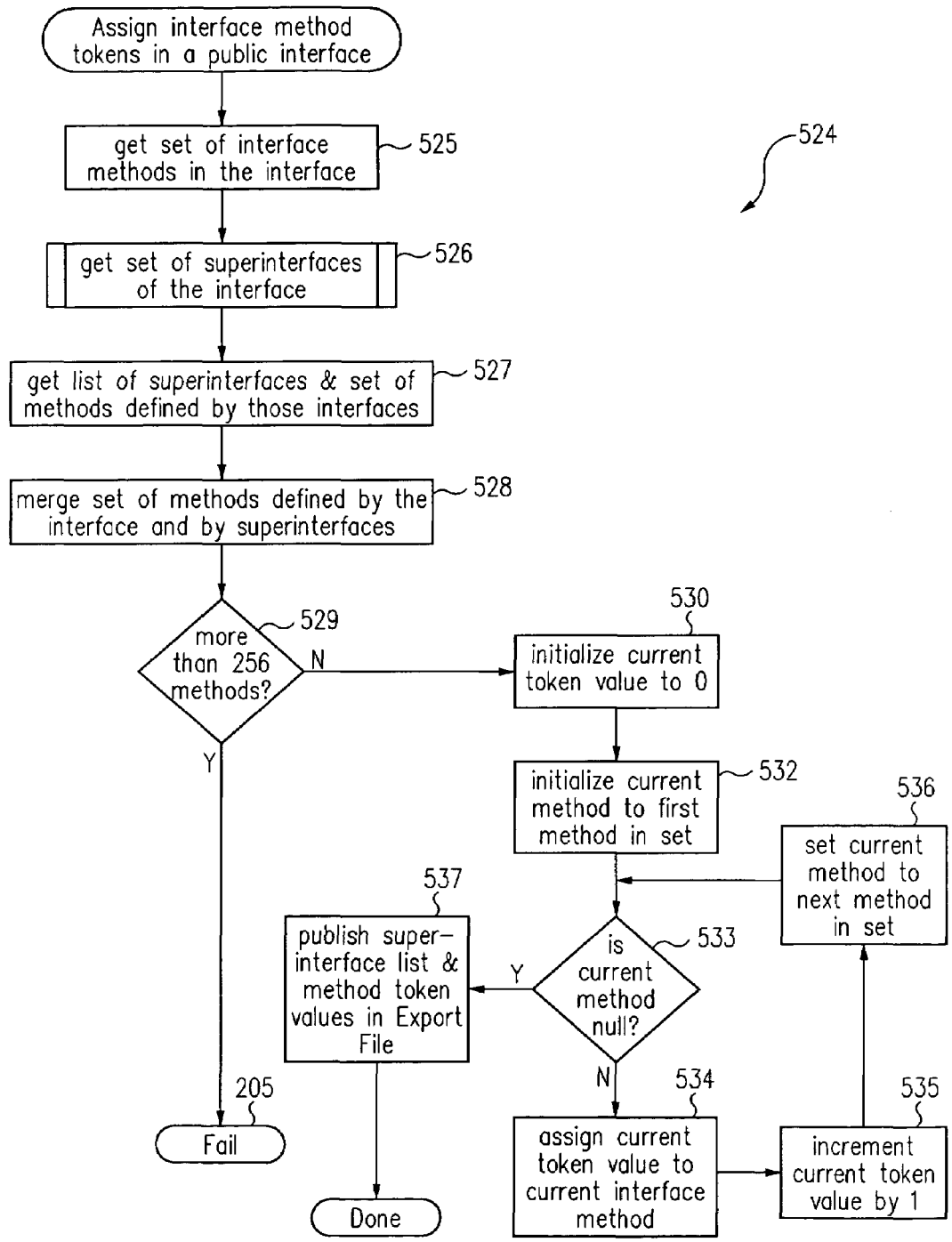
Figures 2, 8H:
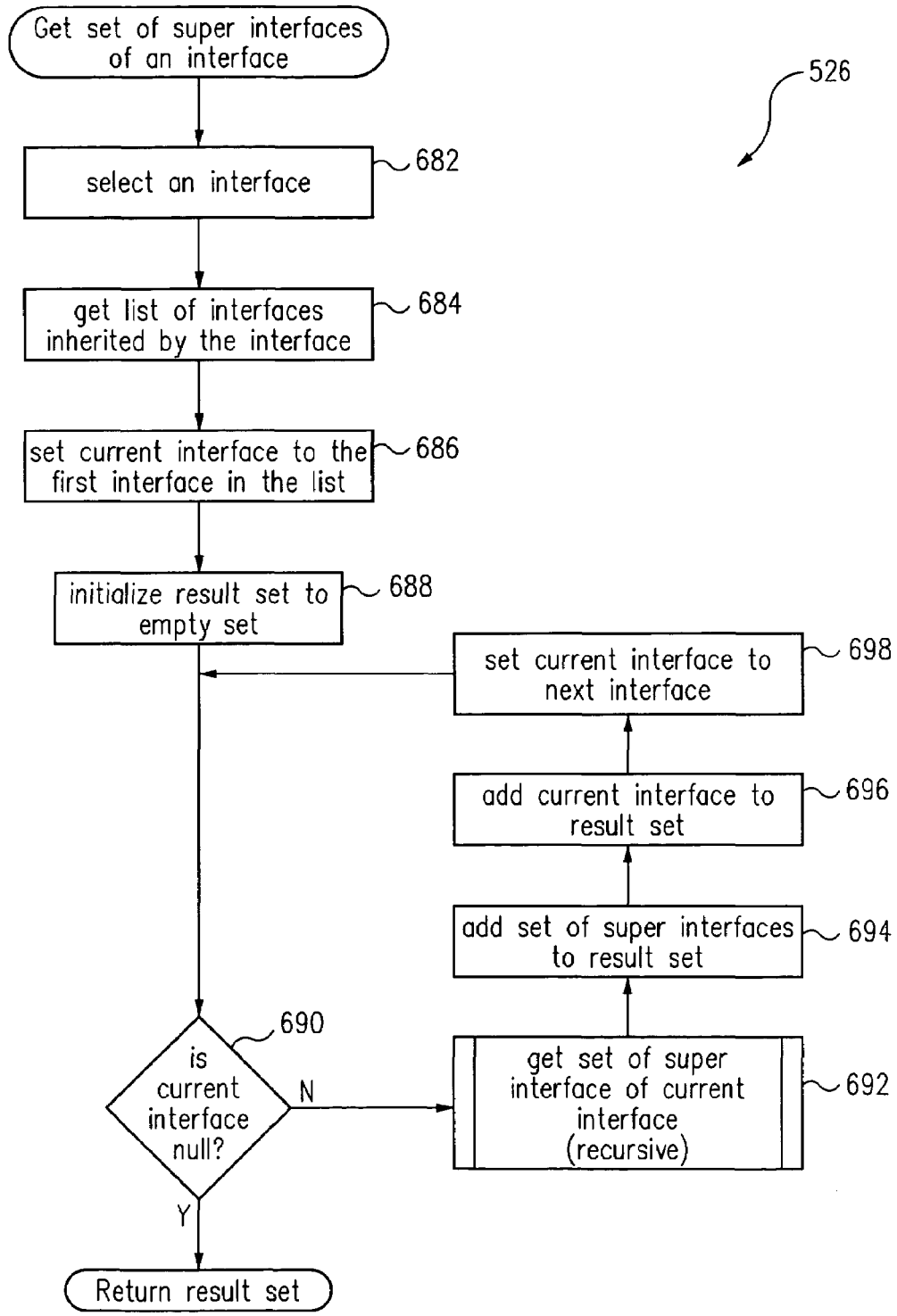

FIGS. 8H-1 and 8H-2 show a process 524 for assigning interface method tokens in a public interface. Particularly, FIG. 8H-2 shows in more detail step 526 of FIG. 8H-1.

Referring now to FIG. 8H-1, the process 524 assigns interface method tokens in a public interface. The process 524 initially obtains a set of interface methods in the public interface (step 525). Next, the process 524 obtains a list of superinterfaces of the interface (step 526). This operation is defined in more detail in FIG. 8H-2. The process 524 then merges the set of methods defined by the interface and by its superinterfaces (step 527). Next, the process 524 checks whether or not more than 256 methods exist (step 529). If so, the process 524 fails (step 205). Alternatively, if less than 256 methods exist, the process 524 sets the current token value to zero (step 530) and initializes the current method to the first method in the method of set of methods (step 532). Next, the process 524 checks whether the current method is null (step 533). If not, the process 524 assigns the current token value to the current interface method (step 534), increments the current token value by one (step 535), and sets the current method for the next method in the set (step 536) before looping back to step 533.

From step 533, if the current method is null, the process 524 publishes the superinterface list associated with the interface and the method token values in the export file (step 537) and exits.

Referring now to FIG. 8H-2, step 526 of FIG. 8H-1 is shown in more detail. First, the process of FIG. 8H-2 selects an interface (step 682). Next, it obtains a list of interfaces inherited by the interface (step 684) and sets the current interface to the first interface in the list (step 686). Next, the process of 8H-2 initializes the results set to an empty set (step 688). From step 688, the process of FIG. 8H-2 iteratively adds interfaces to a result set. This is done by first checking whether the current interface is null, indicating that no other interfaces need to be processed (step 690). If not, the process obtains a set of superinterface of the current interface (step 692). Step 692 invokes the process 526, recursively.

Upon completing step 692, the process of FIG. 8H-2 adds the set of superinterfaces to a result set (step 694) and the current interface to the result set (step 696). The process then sets the current interface to the next interface (step 698) and loops back to step 690 to continue processing all interfaces. From step 690, in the event that the current interface is null, the process of FIG. 8H-2 exits by returning the result set.

An interface table contains an entry for each interface directly implemented by a class, and for all superinterfaces of the directly implemented interfaces. Each entry in the interface table contains an identification of the interface and an interface method table. The table maps interface method declarations to implementations in the class.

Figures 1, 8I:
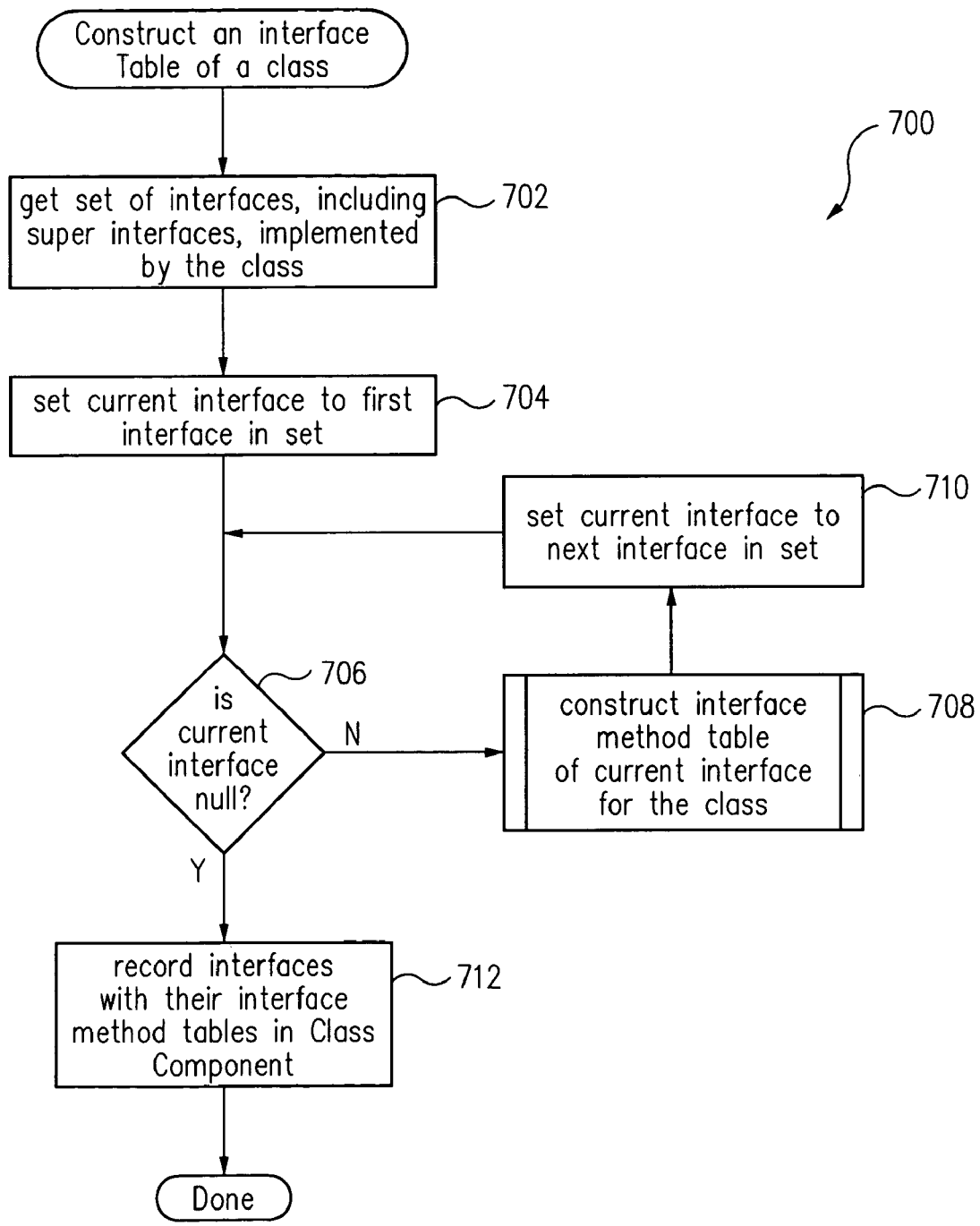
Figures 2, 8I:
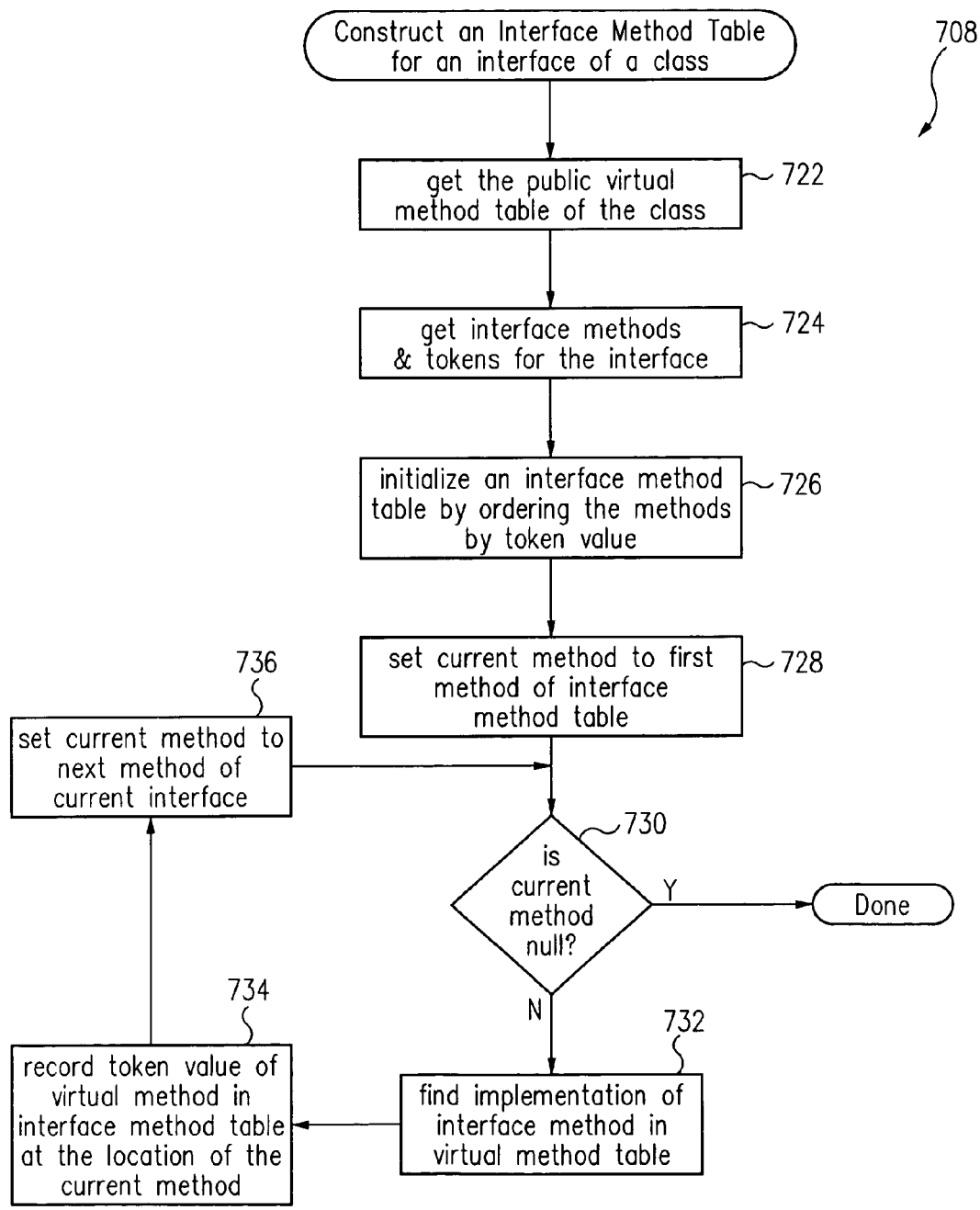

FIGS. 8I-1 and 8I-2 show a process 700 for constructing an interface table of a class. Particularly, a FIG. 8I-2 shows in more detail steps 708 of FIG. 8I-1.

Referring now to FIG. 8I-1, a process 700 for constructing interface tables is shown. First, the process 700 obtains a list of interfaces, including superinterfaces, (see process 526) that are implemented by the current class (step 702). Next, the process 700 sets the current interface to the first interface in this set (step 704). The process 700 then checks whether the current interface is null, indicating that it is finished (step 706). If not, the process 700 proceeds to construct an interface method table for the current interface for the class (step 708), as shown in more detail in FIG. 8I-2. Next, the process 700 sets a current interface to the next interface (step 710) before it loops back to step 706.

From step 706, in the event that the current interface is null, the process 700 records the interfaces with their interface method tables in the class component (step 712) before exiting.

Referring now to FIG. 8I-2, step 708 is shown in more detail. This process first gets the virtual method table for the class (step 722) and the interface methods and tokens for the interface, including inherited methods (step 724). Next, the process of FIG. 8I-2 initializes an interface method table by ordering the methods by their token value (step 726). Next, the process sets the current method to the first method of the interface method table (step 728). From step 728, the process checks whether the current method is null indicating that it is finished (step 730). If not, the process of FIG. 8I-2 finds an implementation of the interface method in the virtual method table (step 732). Next, the process records a token value of the virtual method in the interface method table at the location of the current method (step 734). It then sets the current method to the next method of the current interface (step 736) before looping back to step 730. From step 730, in the event that the current method is null, the process of FIG. 8I-2 exits.

The dynamic binding of elements during execution is discussed next in FIGS. 9A-9C which describe resolution of references to dynamic elements. During compilation, conversion and token assignment, references to instance fields, virtual methods and interfaces methods cannot be resolved to a particular implementation, but only to an abstract description of the item.

In the case of instance fields, tokens are assigned within the scope of the defining class. An instance of the class contains all of the fields defined not only by the class, but also by all of its superclasses. The tokens do not indicate the location of the field within the instance, since they cannot reflect a particular layout of the instance and cannot account for the location of private and package-visible fields defined by the superclass.

In the case of virtual methods, during compilation and conversion the name and type signature are known, as well as a class within a hierarchy that implements such a method. However, the exact implementation cannot be known until execution, when it is possible to determine the particular class of the instance on which the method is invoked. For example, both a class A and its superclass B implement a method definition M. It cannot be known until execution whether an invocation of the method M on an instance of compile-time type B will result in execution of the implementation of class A or of class B.

To provide a means for properly dispatching an invocation of a virtual method during execution, virtual method token assignment is scoped within a class hierarchy. That is, a method of a subclass that overrides a method previously introduced in a superclass inheritance chain must have the same token value as the method it overrides. Also, introduced methods (those methods that do not override methods defined in a superclass) must have token values that are unique within the inheritance chain. Virtual method tables are defined for each class to provide a means for mapping a virtual method token to a particular implementation.

Interface methods are similar to virtual methods in that the particular implementation cannot be known until execution time, but they differ in that interface methods can be inherited from multiple interfaces. Multiple inheritance of interface causes a problem with the way virtual method tokens are assigned. A method in a class which overrides a method introduced in more than one interface cannot necessarily have the same token value as the methods it overrides, as the multiple definitions may all have different values. Therefore each set of methods for a particular interface is assigned token values without regard to the token values of the methods of any other interface.

Because interfaces do not share token values, additional information is necessary to dispatch an interface method invocation to a particular method implementation. As interface method tokens are unique within the scope of an interface, both the interface method token and the identity of the interface are needed to determine the method implemented by the class of an instance at execution time. An interface table is defined for each class which maps an interface identity to an interface method table. The interface method table maps the interface method tokens for that interface to method implementations in that class.

Figure 9A:
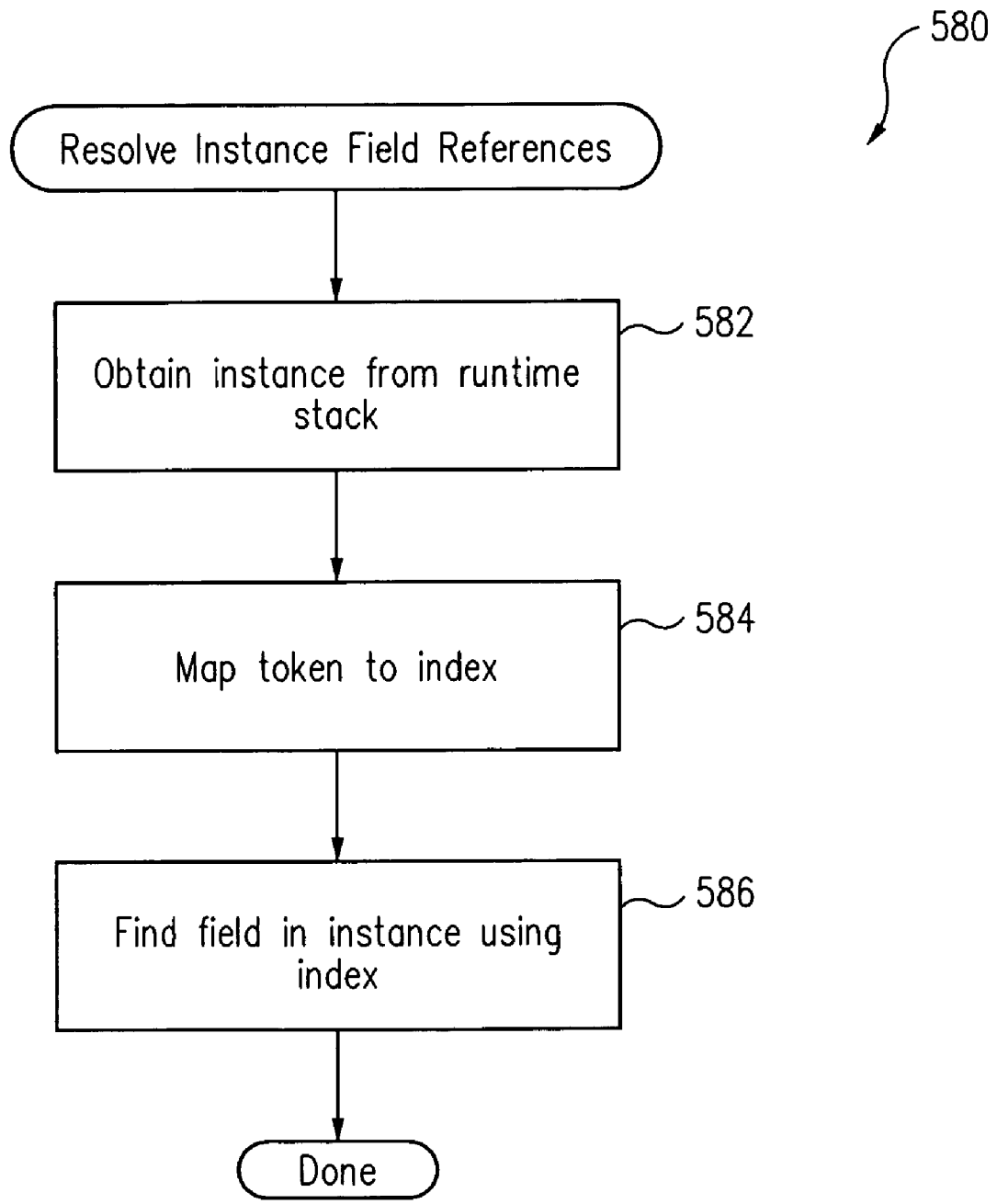
FIGS. 9A-9C are flowcharts illustrating processes for resolving tokens for instance fields and methods.
Figures 1, 9B:
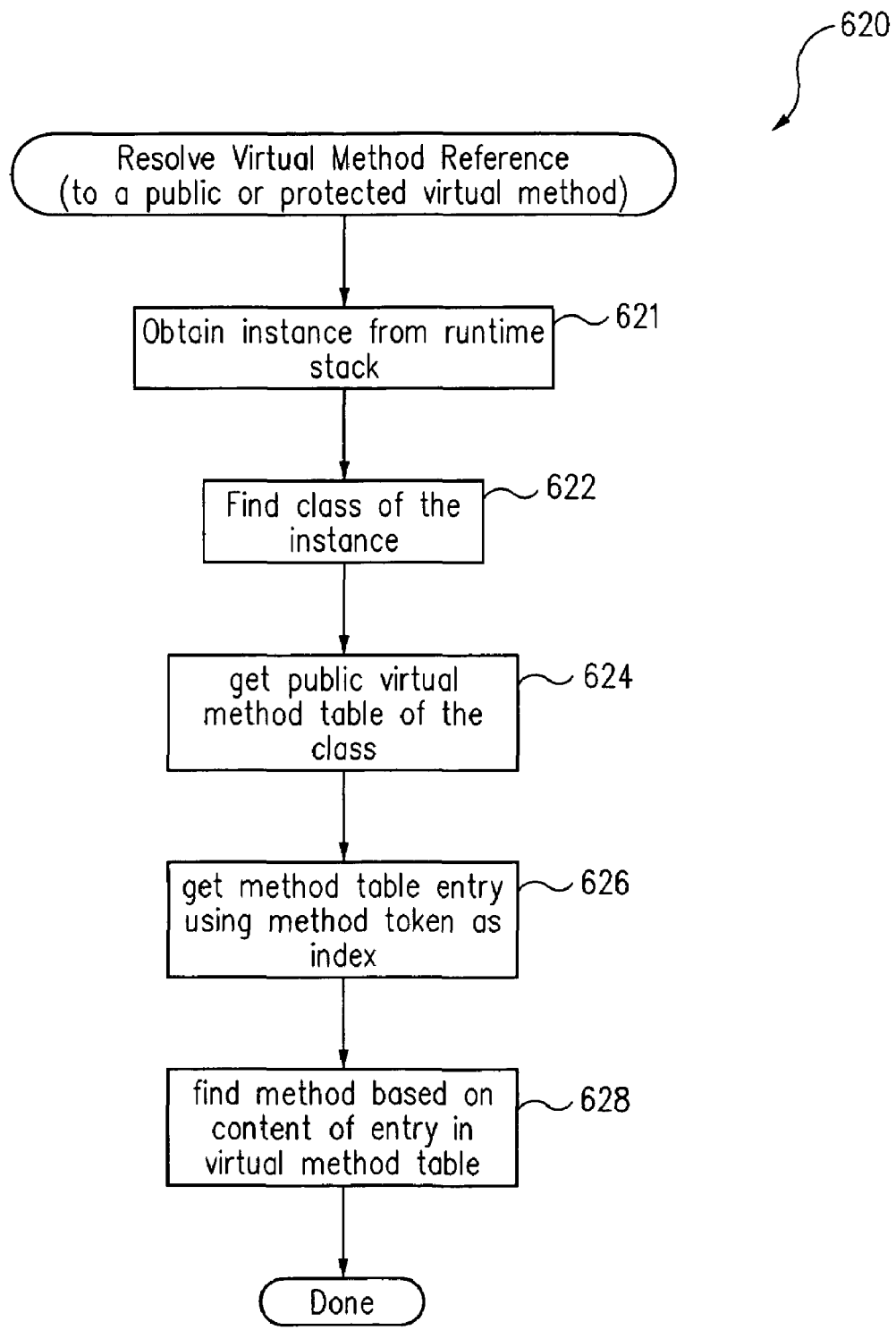
Figures 2, 9B:
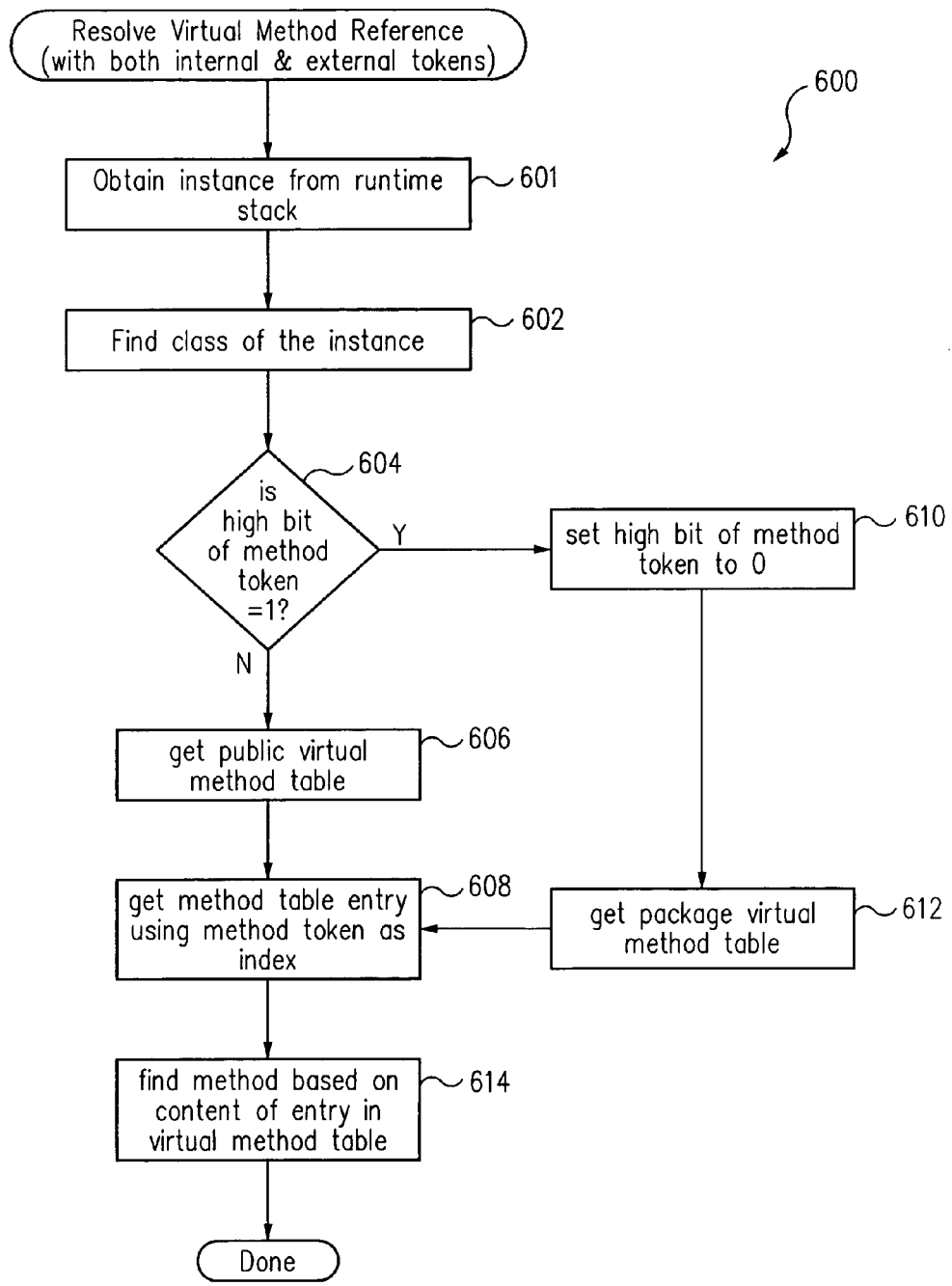
Figures 3, 9B:
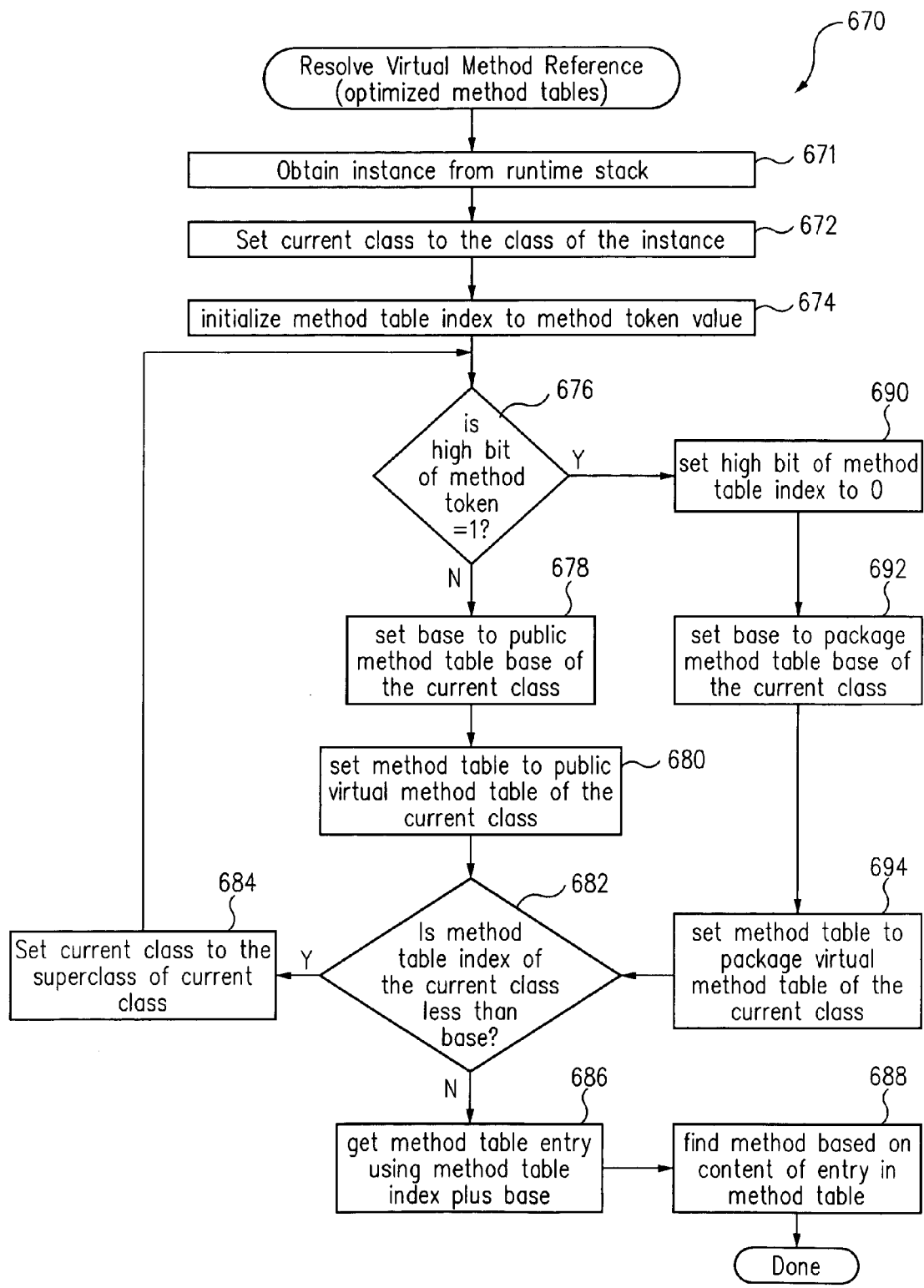
Figure 9C:
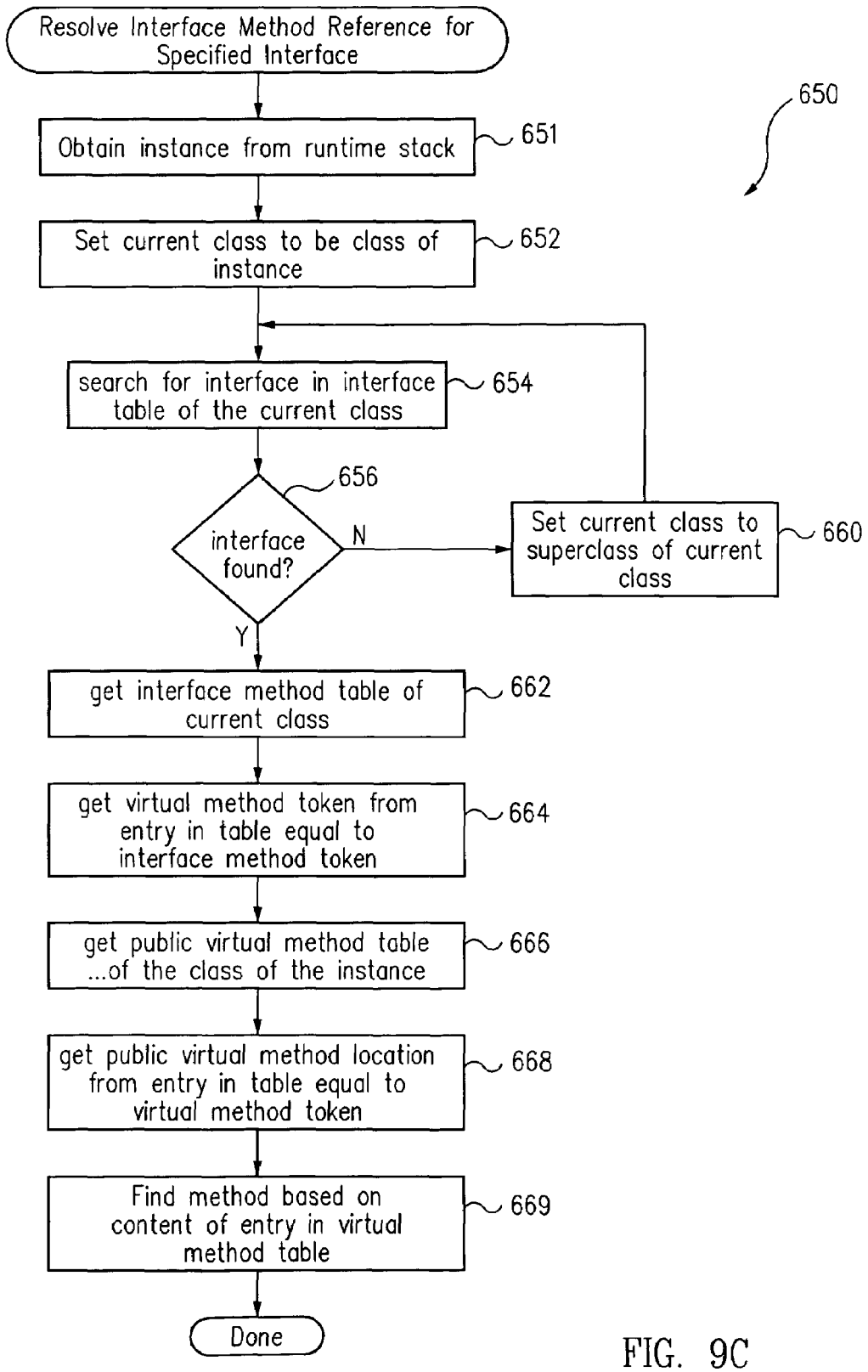

FIGS. 9A-9C are flowcharts illustrating processes for resolving tokens during the execution. Referring now to FIG. 9A, a process 580 for resolving instance field references is shown. First, the process 580 obtains an instance containing the field from a run-time stack (step 582). Next, the process 580 determines a token associated with the field and maps the token to an index (step 584). The mapping of the token to the index may require examining instance field type information. Moreover, the operation may require adjusting the token value by the size of the superclass's instance. Finally, the process 580 finds the representation of the field in the instance using the index (step 586) before exiting.

In FIG. 9B-1, a process 620 for resolving a reference to public or protected virtual method is shown. First, the process 620 obtains an instance of a class from the runtime stack (step 621) and determines the class of the instance (step 622). Next, the process 620 accesses the public virtual method table of the class (step 624) and obtains a method table entry using the method token as an index (step 626). Finally, the process 620 finds and executes the method based on the content of the entry in the virtual method table (step 628) and exits.

Turning now to FIG. 9B-2, a process 600 for resolving a reference to any virtual method (including package-visible) is shown. First, the process 600 obtains an instance of a class from the runtime stack (step 601) and determines the class of the instance (step 602). Next, the process 600 determines whether the high bit of the method token is set to one (step 604). If not, the process 600 gets a public virtual method table (step 606) and uses the method token as an index into the virtual method table (step 608). From step 604, in the event that the high bit of the method token equals one, the process 600 then sets the high bit to zero (step 610) and gets the package virtual method table (step 612) before proceeding to step 608. Finally, the process 600 finds and executes the method based on the content of the entry in the virtual method table (step 614) and exits.

FIG. 9B-3 shows an optimized process 670 for resolving a reference to any virtual method, using optimized virtual method tables as described in FIG. 8G-2. First, the process 670 obtains an instance of a class from the runtime stack (step 671) and sets the current class to be the class of the instance (step 672). A method table index is initialized to the method token value (step 674). The process 670 then determines whether the high bit of the method token equals one (step 676). If not, the process 670 sets a base value to the public method table's base of the current class (step 678). Next, the method table is set to the public virtual method table of the current class (step 680). The process 670 then checks whether the method table index is less than the base value (step 682) and if so, sets the current class to be the superclass of the current class (step 684). From step 684, the process 670 loops back to step 676 to continue processing.

In step 676, if the high bit equals one, the process 670 sets the high bit of the method table index to zero (step 690). It sets the base value to the package method table base of the current class (step 692) and sets the method table to the package virtual method table of the current class (step 694) before continuing to step 682.

From step 682, if the method table index is greater than the base, the process 670 obtains a method table entry using the method table index plus the base value (step 686). The process 670 then finds the method based on the content of the entry in the method table of the current class (step 688). Subsequently, the process 670 exits.

Referring now to FIG. 9C, a process 650 for resolving interface method reference is shown. First, the process 650 obtains an instance of a class from the runtime stack (step 651) and sets the current class to the class of the instance (step 652). Next, the process 650 searches for the specified interface in the interface table of the current class (step 654). The process then determines whether the interface has been found (step 656). If not, the process then sets current class to the superclass of the current class (step 660) before looping back to step 654.

From step 656, in the event that the specified interface is found, the process 650 obtains the corresponding interface method table in the current class (step 662). It then obtains the virtual method token from the entry in the table whose index is equal to the interface method token (step 664). The process 650 then obtains the public virtual method table of the class of the instance (step 666). The process 650 gets the virtual method location from the entry in the table associated with the virtual method token (step 668). The process 650 then locates the method based on the content of the entry in the virtual method table (step 669). Once this is done, the process 650 exits.

Although the invention has been illustrated with respect to a smart card implementation, the invention applies to other devices with a small footprint such as devices that are relatively restricted or limited in memory or in computing power or speed. Such resource constrained devices may include boundary scan devices, field programmable devices, pagers and cellular phones among many others. The invention may prove advantageous when using servlets if there is object sharing between them. Certain desktop systems may also utilize the techniques of the invention.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given. Further, it will be appreciated that a virtual machine consistent with the invention can provide functionality beyond that of earlier virtual machines, such as the virtual machines described in the Java™ Virtual Machine Specification.

While the Java™ programming language and platform are suitable for the invention, any language or platform having certain characteristics would be well suited for implementing the invention. These characteristics include type safety, pointer safety, object-oriented, dynamically linked, and virtual-machine based. Not all of these characteristics need to be present in a particular implementation. In some embodiments, languages or platforms lacking one or more of these characteristics may be utilized. A "virtual machine" could be implemented either in bits (virtual machine) or in silicon (real/physical machines/application specific integrated circuits). Also, although the invention has been illustrated showing object by object security, other approaches, such as class by class security could be utilized.

The system of the present invention may be implemented in hardware or in computer program. Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

The program is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. A method for enabling a small virtual machine suitable for execution on a resource-constrained device, the method comprising:
   performing a processing function on a resource-rich device;
   recording a result of said performing; and
   communicating said result to a resource-constrained device using one or more tokens, said resource-constrained device configured to use said one or more tokens in lieu of performing said processing function.

2. The method of claim 1 wherein said processing function comprises identifying a location of one or more static fields.

3. The method of claim 2 wherein said one or more static fields comprises one or more external static fields.

4. The method of claim 3 wherein said processing function comprises identifying a location of one or more static methods.

5. The method of claim 4 wherein said one or more static methods comprises one or more internal static methods.

6. The method of claim 4 wherein said one or more static methods comprises one or more external static methods.

7. The method of claim 1 wherein said one or more static fields comprises one or more internal static fields.

8. The method of claim 1 wherein said processing function comprises identifying a location of one or more classes.

9. The method of claim 8 wherein said one or more classes comprises one or more internal classes.

10. The method of claim 8 wherein said one or more classes comprises one or more external classes.

11. The method of claim 1 wherein said processing function comprises identifying a location of one or more instance fields within a class instance, said one or more tokens comprising one or more indices.

12. The method of claim 1 wherein said processing function comprises identifying a location of one or more virtual methods within a class virtual method table, said one or more tokens comprising one or more indices.

13. The method of claim 1 wherein said processing function comprises identifying a location of one or more interface methods within a class interface method table, said one or more tokens comprising one or more indices.

14. The method of claim 1 wherein said processing function comprises identifying a location of one or more static public items that can be exported.

15. An apparatus for enabling a small virtual machine suitable for execution on a resource-constrained device, the apparatus comprising:
    means for performing a processing function on a resource-rich device;
    means for recording a result of said performing; and
    means for communicating said result to a resource-constrained device using one or more tokens, said resource-constrained device configured to use said one or more tokens in lieu of performing said processing function.

16. The apparatus of claim 15 wherein said processing function comprises identifying a location of one or more static fields.

17. The apparatus of claim 16 wherein said one or more static fields comprises one or more internal static fields.

18. The apparatus of claim 16 wherein said one or more static fields comprises one or more external static fields.

19. The apparatus of claim 15 wherein said processing function comprises identifying a location of one or more static methods.

20. The apparatus of claim 19 wherein said one or more static methods comprises one or more internal static methods.

21. The apparatus of claim 19 wherein said one or more static methods comprises one or more external static methods.

22. The apparatus of claim 15 wherein said processing function comprises identifying a location of one or more classes.

23. The apparatus of claim 22 wherein said one or more classes comprises one or more internal classes.

24. The apparatus of claim 22 wherein said one or more classes comprises one or more external classes.

25. The apparatus of claim 15 wherein said processing function comprises identifying a location of one or more instance fields within a class instance, said one or more tokens comprising one or more indices.

26. The apparatus of claim 15 wherein said processing function comprises identifying a location of one or more virtual methods within a class virtual method table, said one or more tokens comprising one or more indices.

27. The apparatus of claim 15 wherein said processing function comprises identifying a location of one or more interface methods within a class interface method table, said one or more tokens comprising one or more indices.

28. The apparatus of claim 15 wherein said processing function comprises identifying a location of one or more static public items that can be exported.

29. A method for enabling a small virtual machine suitable for execution on a resource-constrained device, the method comprising:
receiving one or more tokens comprising a result of performing a processing function on a resource-rich device; and
using said one or more tokens on said resource-constrained device in lieu of performing said processing function.

30. The method of claim 29 wherein said processing function comprises identifying a location of one or more static fields.

31. The method of claim 30 wherein said one or more static fields comprises one or more internal static fields.

32. The method of claim 30 wherein said one or more static fields comprises one or more external static fields.

33. The method of claim 29 wherein said processing function comprises identifying a location of one or more static methods.

34. The method of claim 33 wherein said one or more static methods comprises one or more internal static methods.

35. The method of claim 33 wherein said one or more static methods comprises one or more external static methods.

36. The method of claim 29 wherein said processing function comprises identifying a location of one or more classes.

37. The method of claim 36 wherein said one or more classes comprises one or more internal classes.

38. The method of claim 36 wherein said one or more classes comprises one or more external classes.

39. The method of claim 29 wherein said processing function comprises identifying a location of one or more instance fields within a class instance, said one or more tokens comprising one or more indices.

40. The method of claim 29 wherein said processing function comprises identifying a location of one or more virtual methods within a class virtual method table, said one or more tokens comprising one or more indices.

41. The method of claim 29 wherein said processing function comprises identifying a location of one or more interface methods within a class interface method table, said one or more tokens comprising one or more indices.

42. The method of claim 29 wherein said processing function comprises identifying a location of one or more static public items that can be exported.

43. An apparatus for enabling a small virtual machine suitable for execution on a resource-constrained device, the apparatus comprising:
means for receiving one or more tokens comprising a result of performing a processing function on a resource-rich device; and
means for using said one or more tokens on resource-constrained device in lieu of performing said processing function.

44. The apparatus of claim 43 wherein said processing function comprises identifying a location of one or more static fields.

45. The apparatus of claim 44 wherein said one or more static fields comprises one or more internal static fields.

46. The apparatus of claim 44 wherein said one or more static fields comprises one or more external static fields.

47. The apparatus of claim 43 wherein said processing function comprises identifying a location of one or more static methods.

48. The apparatus of claim 47 wherein said one or more static methods comprises one or more internal static methods.

49. The apparatus of claim 47 wherein said one or more static methods comprises one or more external static methods.

50. The apparatus of claim 43 wherein said processing function comprises identifying a location of one or more classes.

51. The apparatus of claim 50 wherein said one or more classes comprises one or more internal classes.

52. The apparatus of claim 50 wherein said one or more classes comprises one or more external classes.

53. The apparatus of claim 43 wherein said processing function comprises identifying a location of one or more instance fields within a class instance, said one or more tokens comprising one or more indices.

54. The apparatus of claim 43 wherein said processing function comprises identifying a location of one or more virtual methods within a class virtual method table, said one or more tokens comprising one or more indices.

55. The apparatus of claim 43 wherein said processing function comprises identifying a location of one or more interface methods within a class interface method table, said one or more tokens comprising one or more indices.

56. The apparatus of claim 43 wherein said processing function comprises identifying a location of one or more static public items that can be exported.

57. A resource-constrained device, comprising:
a memory for storing one or more tokens comprising the result of performing a processing function on a resource-rich device; and
a processor coupled to said memory and configured to:
receive said one or more tokens; and
use said one or more tokens on said resource-constrained device in lieu of performing said processing function.

58. The resource-constrained device of claim 57 wherein said processing function comprises identifying a location of one or more static fields.

59. The resource-constrained device of claim 58 wherein said one or more static fields comprises one or more internal static fields.

60. The resource-constrained device of claim 58 wherein said one or more static fields comprises one or more external static fields.

61. The resource-constrained device of claim 57 wherein said processing function comprises identifying a location of one or more static methods.

62. The resource-constrained device of claim 61 wherein said one or more static methods comprises one or more internal static methods.

63. The resource-constrained device of claim 61 wherein said one or more static methods comprises one or more external static methods.

64. The resource-constrained device of claim 57 wherein said processing function comprises identifying a location of one or more classes.

65. The resource-constrained device of claim 64 wherein said one or more classes comprises one or more internal classes.

66. The resource-constrained device of claim 64 wherein said one or more classes comprises one or more external classes.

67. The resource-constrained device of claim 57 wherein said processing function comprises identifying a location of one or more instance fields within a class instance, said one or more tokens comprising one or more indices.

68. The resource-constrained device of claim 57 wherein said processing function comprises identifying a location of one or more virtual methods within a class virtual method table, said one or more tokens comprising one or more indices.

69. The resource-constrained device of claim 57 wherein said processing function comprises identifying a location of one or more interface methods within a class interface method table, said one or more tokens comprising one or more indices.

70. The resource-constrained device of claim 57 wherein said processing function comprises identifying a location of one or more static public items that can be exported.

71. The resource-constrained device resource-constrained device of claim 57 wherein said resource-constrained device comprises a smart card.

* * * * *

UNITED STATES PATENT AND TRADEMARK OFFICE
CERTIFICATE OF CORRECTION

PATENT NO.       : 7,444,631 B2                                  Page 1 of 1
APPLICATION NO.  : 10/997359
DATED            : October 28, 2008
INVENTOR(S)      : Judith E. Schwabe and Joshua B. Susser It is certified that error appears in the above-identified patent and that said Letters Patent is hereby corrected as shown below:

In Column 26, Claim 71, Lines 9-10, delete "resource-constrained device".

Signed and Sealed this

Tenth Day of March, 2009

JOHN DOLL
*Acting Director of the United States Patent and Trademark Office*